US006493784B1

(12) United States Patent
Kamimura et al.

(10) Patent No.: US 6,493,784 B1
(45) Date of Patent: Dec. 10, 2002

(54) COMMUNICATION DEVICE, MULTIPLE BUS CONTROL DEVICE AND LSI FOR CONTROLLING MULTIPLE BUS

(75) Inventors: Takeshi Kamimura, Nakai-machi (JP); Shinobu Ozeki, Nakai-machi (JP); Kazuhiro Sakai, Nakai-machi (JP); Kenichi Kobayashi, Nakai-machi (JP); Masao Funada, Nakai-machi (JP); Hiroshi Fujimagari, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/454,858

(22) Filed: Dec. 7, 1999

(30) Foreign Application Priority Data

Dec. 25, 1998 (JP) .......................................... 10-370224

(51) Int. Cl.[7] .......................... G06F 12/00; G06F 13/36
(52) U.S. Cl. ...................... 710/309; 710/240; 710/241; 710/242; 710/243
(58) Field of Search ................................ 710/309, 107, 710/106, 240, 241, 242, 243

(56) References Cited

U.S. PATENT DOCUMENTS

| 5,195,089 A | * | 3/1993 | Sindhu et al. ............. 370/85.1 |
| 5,363,428 A | * | 11/1994 | Nagashima .................. 379/58 |
| 5,717,852 A | * | 2/1998 | Izumo et al. ................. 714/56 |
| 5,872,937 A | * | 2/1999 | Jaramillo .................... 710/107 |
| 5,936,953 A | * | 8/1999 | Simmons .................... 370/364 |
| 6,049,841 A | * | 4/2000 | Fields, Jr. et al. ............ 710/28 |
| 6,185,221 B1 | * | 2/2001 | Aybay ........................ 370/412 |

FOREIGN PATENT DOCUMENTS

| JP | A-4-305757 | 10/1992 |
| JP | A-5-282242 | 10/1993 |
| JP | A-8-63443 | 3/1996 |
| JP | A-8-83228 | 3/1996 |
| JP | A-10-123374 | 5/1998 |

OTHER PUBLICATIONS

Wilkinson, B., *Computer Architecture: Design and Performance Second Edition*, Toppan Publishing Company, 1996, pp. 295–297.
Amano, H., *Parallel Computers*, Shokodo Publishing Company, 1996, pp. 295–297.
Uchida, T., *Prospects for Optical Mount Technology*, 9th Circuit Mounting Lecture Meeting 15C–01, pp. 201–202.
Tomimura, H. et al., *Packaging Technology for Optical Interconnects*, IEEE Tokyo 1994, No. 33, pp. 81–86.
Wada, O., *Electronics*, the Apr. issue, 1993, 52–55.

* cited by examiner

*Primary Examiner*—Peter Wong
*Assistant Examiner*—Tim Vo
(74) *Attorney, Agent, or Firm*—Oliff & Berridge, PLC

(57) ABSTRACT

The present invention provides a multiple bus control device and others which can also be applied to access control by a signal having a directional propagation property for implementing various communication between/among modules. Each of plural modules makes a request for communication to a multiple bus control device by sending communication request information for specifying one or more communication partner modules to the multiple bus control device. The multiple bus control device checks an idle state of a module to be communicated and an idle channel in a multiple bus based upon received communication request information and permits communication between a module which sends communication request information using the idle channel and a communication partner module specified in the communication request information.

12 Claims, 22 Drawing Sheets

FIG. 4A
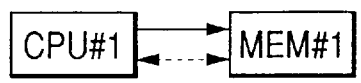
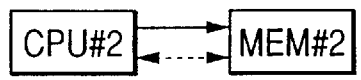
POINT-TO-POINT (RW)
FIG. 4B
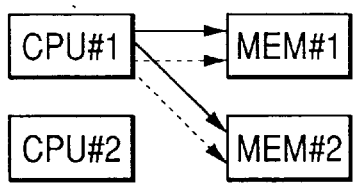
BROADCAST (W)
FIG. 4C
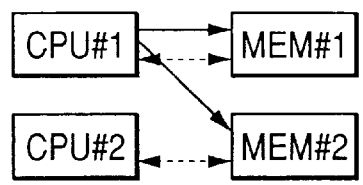
ADDRESS BROADCAST (RW)
FIG. 4D
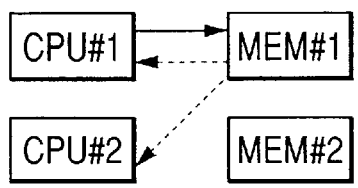
READ DATA BROADCAST (R)
FIG. 4E
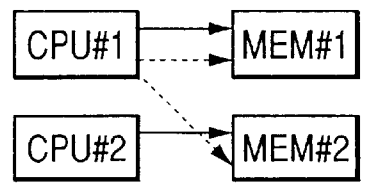
WRITE DATA BROADCAST (W)

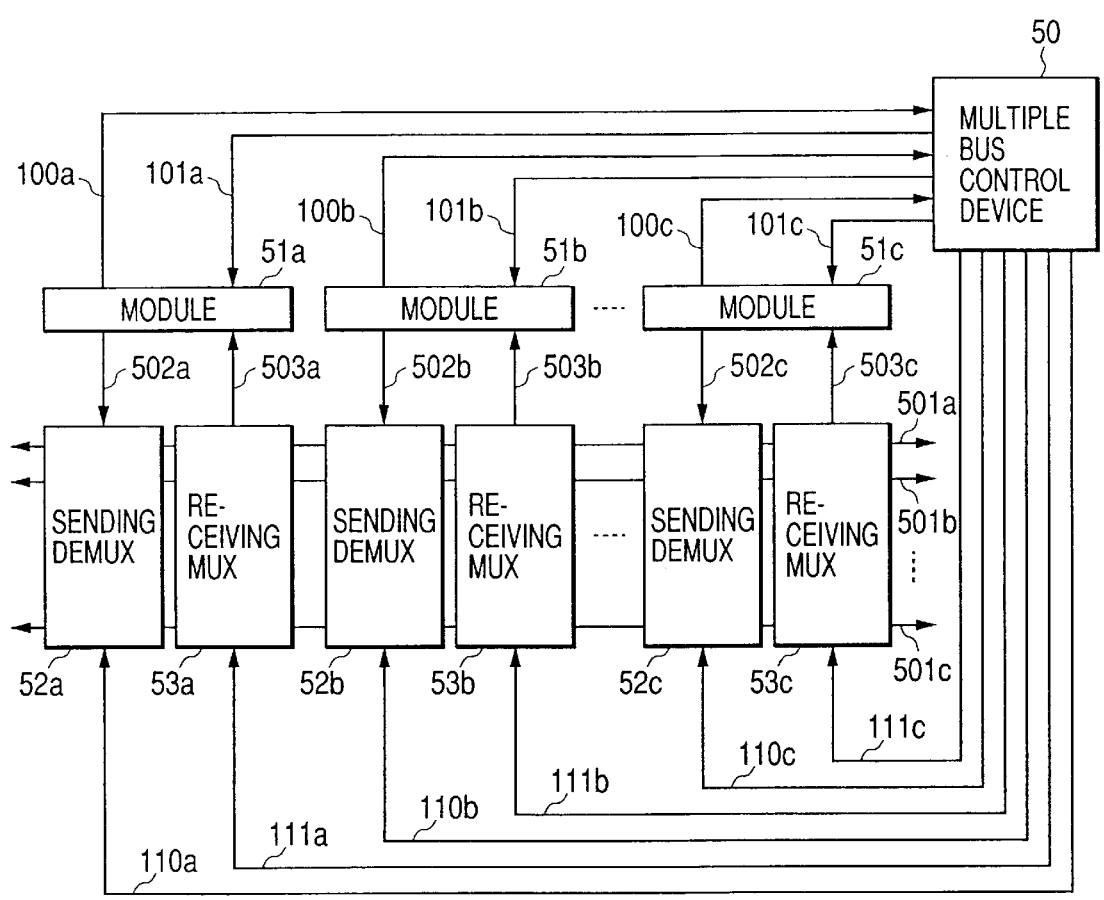

| SENDING MODULE NUMBER | PERMISSION FLAG | REQUEST FLAG |
|---|---|---|
| 1 | 1 | 1 |
| 2 | 0 | 1 |
| ⋮ | 0 | 0 |
| N | 0 | 0 |

FIG. 16

| SENDER | COMMUNICATION DESTINATION ADDRESS REGISTER FILE ADDRESS | REQUEST FLAG | TERMINATION FLAG |
|---|---|---|---|
| 1 | 0 | 1 | 0 |
| 2 | 1 | 1 | 0 |
| ... | X | 0 | 0 |
| N | X | 0 | 0 |

FIG. 17

| MODULE NUMBER | | | | | | | | | |
|---|---|---|---|---|---|---|---|---|---|
| SENDER | SENDING DESTINATION (PLURAL SPECIFICATIONS ALLOWED) | | | | RESPONSE MODULE | RESPONDING DESTINATION (PLURAL SPECIFICATIONS ALLOWED) | | | |
| | (1) | (2) | ... | (N) | | (1) | (2) | ... | (N) | PRIORITY | COMMUNICATION DESTINATION ADDRESS REGISTER FILE ADDRESS |
| 1 | 0 | 1 | ... | 0 | 2 | 1 | 0 | ... | 0 | 2 | 0 |
| 1 | 0 | 0 | ... | 1 | N | 0 | 0 | ... | 1 | 2 | 1 |
| 2 | 1 | 1 | ... | 1 | N | 0 | 1 | ... | 0 | 1 | 0 |
| 2 | 1 | 0 | ... | 1 | 1 | ... | ... | ... | ... | ... | ... |

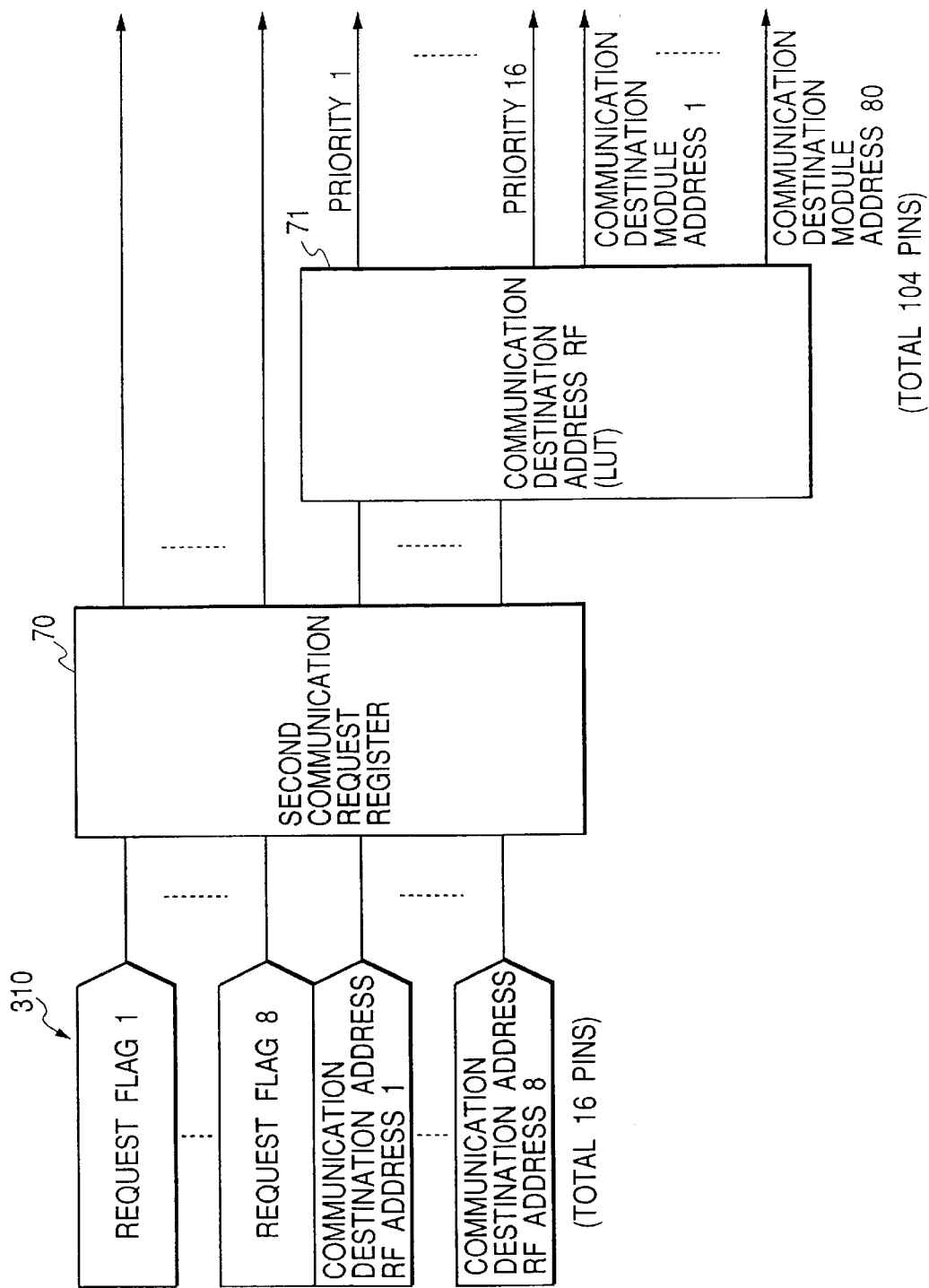

FIG. 25

| MODULE NUMBER | RESULT OF ARBITRATION | SENDING ENABLE OR NOT | SENDING CHANNEL NUMBER (PLURAL ALLOWED) | | | | RECEIVING ENABLE OR NOT | RECEIVING CHANNEL NUMBER (PLURAL ALLOWED) | | | | EXISTENCE OF UNSENT/UNRECEIVED DESTINATION |
|---|---|---|---|---|---|---|---|---|---|---|---|---|
| | | | 1 | 2 | ... | K | | 1 | 2 | ... | K | |
| 1 | 1 | 1 | 1 | 1 | 0 | 0 | 1 | 0 | 1 | 0 | 0 | 0 |
| 2 | 0 | 1 | 0 | 0 | 0 | 0 | 1 | 1 | 0 | 0 | 0 | 0 |
| ... | 0 | 0 | 1 | 1 | 0 | 0 | 0 | 0 | 0 | 0 | 0 | 0 |
| N | 0 | 0 | 0 | 0 | 0 | 0 | 0 | 0 | 0 | 0 | 0 | 0 |

SIGNAL 101 → (arbitration result column)
SIGNAL 110 → (sending channel columns)
SIGNAL 111 → (receiving channel columns)

FIG. 26

| SENDING MODULE NUMBER | PERMISSION FLAG | REQUEST FLAG | UNSENT/UNRECEIVED STATE FLAG |
|---|---|---|---|
| 1 | 1 | 1 | 0 |
| 2 | 0 | 1 | 0 |
| ... | 0 | 0 | 0 |
| N | 0 | 0 | 0 |

COMMUNICATION DEVICE, MULTIPLE BUS CONTROL DEVICE AND LSI FOR CONTROLLING MULTIPLE BUS

BACKGROUND OF THE INVENTION

1. Field of the Invention

The present invention relates to a communication device provided with a multiple bus having plural channels via each of which a signal is transmitted and plural modules for sending/receiving a signal via the multiple bus, a multiple bus control device for arbitrating requests for communication between the plural modules via the multiple bus and an LSI for controlling the multiple bus in which the multiple bus control device is realized.

2. Description of the Related Art

Recently, a data processing rate by LSI has been rapidly accelerated by the progress of semiconductor integration technology. As the data processing rate is accelerated, the enhancement of signal transmission ability is demanded for a wiring board packaging a semiconductor integrated circuit.

Particularly in recent years, so-called parallel processing architecture provided with plural high speed CPU chips is adopted in a server-type system equivalent to a high-order device of a personal computer. The classification of the parallel processing architecture is described on pages 6 to 13 of "Parallel computers" written by DR. Hideharu Amano and published by Shokodo for example. According to this book, if a system is composed of plural modules for executing data processing such as CPU, a method of connecting modules is classified into a type of connection via a bus, a type of connection via a switch and a type of connection via a network. Of these, the type of connection via a bus is not suitable for the connection of multiple modules, however, the type has a merit that the structure is simple, compared with other types, the quantity of hardware is small and the type is excellent in expandability. The type of connection via a bus is widely used in a commercial computer including a personal computer and computer application products.

In connection via a bus, communication performance proportional to the processing rate and the number of connected modules is demanded. Many multiple bus systems each of which enables enhancing communication performance by multiplexing a bus itself are proposed. In the case of a parallel processing system, as plural modules can access to each bus, means to solve access contention is required. For the above means, for example, Japanese Published Unexamined Patent Application No. Hei 5-282242 is disclosed. In the above application, an bus arbiter that arbitrates access contention is provided and each bus master outputs a request for transmission to the bus arbiter. In the meantime, the bus arbiter first retrieves an idle bus signal line, determines a bus master which is permitted to use the bus signal line and sends a signal showing that the use of the bus signal line is permitted or unpermitted to each bus master.

A concrete example of the configuration of a bus arbiter in a multiple bus system is described on pages 295 to 297 of the second edition "Computer Architecture Design and Performance" written by B. Wilkinson, translated by Yoshizo Takahashi and published by Prentise Hall/Toppan for example. Referring to FIG. 1, the configuration of a bus arbiter will be described below.

FIG. 1 shows an example of a conventional type multiple bus control device.

In a multiple bus, there occur not only bus contention but access contention to a communication destination such as a memory. To solve the above problem, an arbiter having two steps as shown in FIG. 1 is provided. A first step is an arbiter provided to a communication destination (memory arbiters 301a and 301b in this example) and hereby, it is determined that one of plural CPUs 303a, . . . , 303z has an access right to access to each memory 302a and 302b. The memory arbiters are required by the number of memories. A second step is a normal bus arbiter 304 and the bus arbiter 304 gives a right to use a bus not to CPU but to the output of each memory arbiter 301a and 301b. Finally, CPU having a right to use each memory and each bus is determined.

As multiple connectors and wiring are required when modules in a parallel processing system are connected, wiring has been multilayered and micronized to enhance communication performance and the density of wiring. However, the multilayering and micronization of wiring are approaching a limit because of the delay of a signal and the distortion of a transmitted waveform caused by capacity between wiring and the resistance of wiring. Electromagnetic interference (EMI) caused by accelerating operating speed is also a serious problem.

As described above, the throughput of a data processor is often limited by the transmission capability of a bus on a wiring board. Then, it is examined to overcome the limit of an electric bus that in-system optical connection technology called optical interconnection is used. For optical interconnection technology, various embodiments are proposed depending upon the contents of the configuration of a system as disclosed on pages 201 and 202 of a lecture by Mr. Uchida in the ninth Circuit Mounting Lecture Meeting 15C01, on pages 81 to 86 of "Packaging Technology for Optical Interconnects", IEEE Tokyo 1994, No. 33 by Mr. H. Tomimuro et al. and on pages 52 to 55 of "Electronics" the April number written by Mr. Wada and published in 1993. The optical interconnection technology has merits that high frequency operation exceeding that in electric interconnection technology is enabled, moreover electromagnetic interference can be reduced, transmission bandwidth can be expanded by multiplexing using wavelength, amplitude and others, and simultaneous two-way communication is enabled.

Particularly, as spatial optical transmission technology enables simultaneous communication among multiple ports and does not require the physical connection of bus signal lines, it is matched with the above multiple bus system. Technology similar to the above technology is disclosed in Japanese Published Unexamined Patent Application No. Hei 4-305757 for example. The above application relates to technology for connecting plural modules such as CPU, a memory and an I/O device not by spatial optical transmission but by radio transmission and radio transmission has merits that simultaneous communication among multiple ports is enabled and the physical connection of bus signal lines is not required similarly to spatial optical transmission, compared with an electric bus. The technology disclosed in Japanese Published Unexamined Patent Application No. Hei 4-305757 relates to a system for implementing communication among modules according to a spread spectrum system and a bus arbiter is provided with a function for connecting arbitrary two modules.

Similarly, technology for implementing simultaneous broadcast communication among multiple ports by spatial optical transmission is disclosed in Japanese Published Unexamined Patent Application No. Hei 10-123374. The above technology realizes optical communication between ports installed on the end face of a flat optical waveguide and realizes a broadcast by branching incident signal light by refracting it and transmitting it on the opposite end face.

FIG. 2 is a schematic drawing showing a state of the transmission of an optical signal provided with a directional propagation property.

As shown in FIG. 2, an optical signal is provided with a directional propagation property and incident light is transmitted only to a port on the opposite end face. FIG. 3 equivalently represents the above state by an electric circuit. A simultaneous communication function in reverse directions is implemented owing to a directional propagation property by setting different channels to reverse directions using the same wavelength, the same communication zone and others which enable only setting one channel in case a two-way propagation property.

In such a conventional type multiple bus system as disclosed in the above Japanese Published Unexamined Patent Application No. Hei 5-282242, multiplexing one-to-one communication between modules or access control to implement broadcast communication is executed. However, in multitask environment in which each module executes an independent task, a communication function that can correspond to further diverse combination is required. Referring to FIG. 4, the above example will be described below. FIG. 4 shows examples of communication variations acquired by combining each address signal line (a full line) and each data signal line (a dotted line) among two CPUs and two memory modules. The following communication variations (1) to (5) are conceivable.

(1) A parallel access by one-to-one communication (FIG. 4A)

(2) Simultaneous writing from one CPU to plural memories by multicast (=one-to-multiple) communication via an address signal line and a data signal line (FIG. 4B)

(3) Only an address is multicast from one CPU and data is accessed in parallel by one-to-one communication. (FIG. 4C)

(4) Only an address is sent from one CPU to one memory and read data is multicast to plural CPUs. (FIG. 4D)

(5) Only an address is sent from each CPU to each memory by one-to-one communication and data is simultaneously written from a specific one CPU to plural memories. (FIG. 4E)

The above (1) to (5) may be also simultaneously required.

To implement access control by which buses are possibly always used to meet these requests, the contention of accesses to a transmission channel and the contention of accesses to a communication destination are required to be simultaneously solved as described above. Particularly, to implement an efficient pipeline access in which address sending from CPU and a data response from a memory can be simultaneously executed in case information is read from a high speed memory to which a pipeline access is enabled, each transmission channel is required to be allocated beforehand so that a sending destination of an address and a response destination of data do not contend with another access.

However, in the above Japanese Published Unexamined Patent Application No. Hei 5-282242, means to solve the contention of accesses to a communication destination is not provided. For example, if a communication partner module is busy, a module that requests communication is required to wait until the partner becomes free and a bus is idle. To prevent such a situation, a distributed transaction method is proposed. According to this method, if a partner module is busy, then communication is once interrupted, a bus signal line is released and after the partner becomes free, processing is started from the arbitration of buses again. However, in this method, the partner is also required to request a bus, an interface circuit to be a bus master is also required to be added to a module such as a memory and there is a problem that the scale of hardware is increased.

In the meantime, a method of the above arbitration shown in FIG. 1 corresponds to problems of both access contention at a communication destination and bus contention. However, as each memory arbiter independently determines an access right to each memory, an access right to plural memories as in multicast communication cannot be acquired.

In the above Japanese Published Unexamined Patent Application No. Hei 4-305757, communication between modules is limited to one-to-one communication and the above (2) to (5) cannot be implemented. A method of concretely implementing access control such as a request for communication and arbitration is not clarified.

Further, in a transmitter depending upon a signal provided with a directional propagation property such as disclosed in the above Japanese Published Unexamined Patent Application No. Hei 10-123374, an availability factor is enhanced by allocating a channel for every direction. In communication among CPUs and memory modules shown in the above (1) to (5), writing to a memory can be implemented by only a channel in a direction from CPU to a memory and a channel in a reverse direction from the memory to CPU can be utilized for other communication. However, there is a problem that in a conventional type multiple bus control device, a function to arbitrate channels independently for every propagational direction and to avoid the contention of accesses to a destination in each propagational direction cannot be implemented.

Further, to detect the contention of accesses to a destination in a sending direction to solve the above problems, an address of an access destination is required to be acquired when communication is requested. In a conventional type bus system, a bus can be requested by one bit per port, however, further, an address of a sending destination and an address signal of a response destination are required. In addition, if the simultaneous specification of arbitrary plural destinations is enabled as in a multicast, the quantity of signals is further increased. As a result, when access control is implemented by an LSI chip, there is a problem that pins to input a communication request signal from each port are remarkably increased.

SUMMARY OF THE INVENTION

The present invention is made to solve the above various problems and implements various communication among modules and to provide a multiple bus control device which can also be applied to access control by a signal having a directional propagation property, an LSI for controlling the multiple bus in which the multiple bus control device is realized and a communication device for implementing various communication among modules.

A communication device according to the present invention is provided with a multiple bus provided with plural channels over each of which a signal is transmitted, plural modules for sending/receiving a signal via the multiple bus and an arbiter for arbitrating a right to use the multiple bus among the plural modules and is characterized in that each of the above plural modules requests communication to the arbiter by sending communication request information for specifying one or more communication partner modules to the arbiter when the above module that requests communication communicates with another one or more modules and in that the above arbiter specifies an idle channel based upon received communication request information in case a communication partner specified in the communication request information is in an idle state in which new communication is possible and an idle channel over which new communication is possible exists in the above multiple bus and permits communication using the specified idle channel between a module which sends the communication request information and a module which is a communication partner specified in the communication request information.

In the multiple bus control device, a communication request receiving unit is provided for receiving a request for communication from each module by receiving communication request information for specifying one or more communication partner modules from each of plural modules for sending/receiving a signal utilizing a multiple bus provided with plural channels over each of which a signal is transmitted, and an arbiter is provided for outputting information for specifying an idle channel and information for specifying plural modules for which communication using the specified idle channel is permitted based upon communication request information received by the communication request receiving unit in case a communication partner specified in the communication request information is in an idle state in which new communication is possible and an idle channel over which new communication is possible exists.

Further, an LSI for controlling a multiple bus according to the present invention is provided with a storage for storing a table describing correspondence between each of plural modules for sending/receiving a signal using a multiple bus provided with plural channels over each of which a signal is transmitted and one or more communication partner modules specified in a request for communication from each module, an input terminal for inputting a communication request signal including information for specifying one correspondence in the above correspondence table from each of the above plural modules, a register for storing information included in the communication request signal input from the above input terminal, an arbiter for generating information for specifying an idle channel and information for specifying plural modules for which communication using the specified idle channel is permitted based upon correspondence in the above correspondence table specified based upon the information stored in the above register in case a communication partner specified based upon the correspondence is in an idle state in which new communication is possible and an idle channel over which new communication is possible exists, and an output terminal for outputting an arbitration signal showing the information generated by the arbiter.

BRIEF DESCRIPTION OF THE DRAWINGS

Preferred embodiments according to the present invention will be described in detail based on the drawings:

FIGS. 4A–4E show an example of communication variations acquired by combining each address signal line (a full line) and each data signal line (a dotted line) among two CPUs and two memories;

FIG. 5 is a block diagram showing a first embodiment of a communication device according to the present invention;

FIG. 16 shows the breakdown of a second communication request signal which is an input signal in the embodiment shown in FIG. 15;

FIG. 17 shows the breakdown of a communication destination address register file;

FIG. 22 is a schematic drawing showing a signal input part of the LSI for controlling the multiple bus shown in FIG. 20;

FIG. 25 shows each breakdown of a communication enabling signal which is an output signal, a sending channel number and a receiving channel number in the embodiment shown in FIG. 24; and FIG. 26 shows the breakdown of an arbitration result signal stored in an arbitration result register in the embodiment shown in FIG. 24.

DESCRIPTION OF THE PREFERRED EMBODIMENTS

Figure 1:
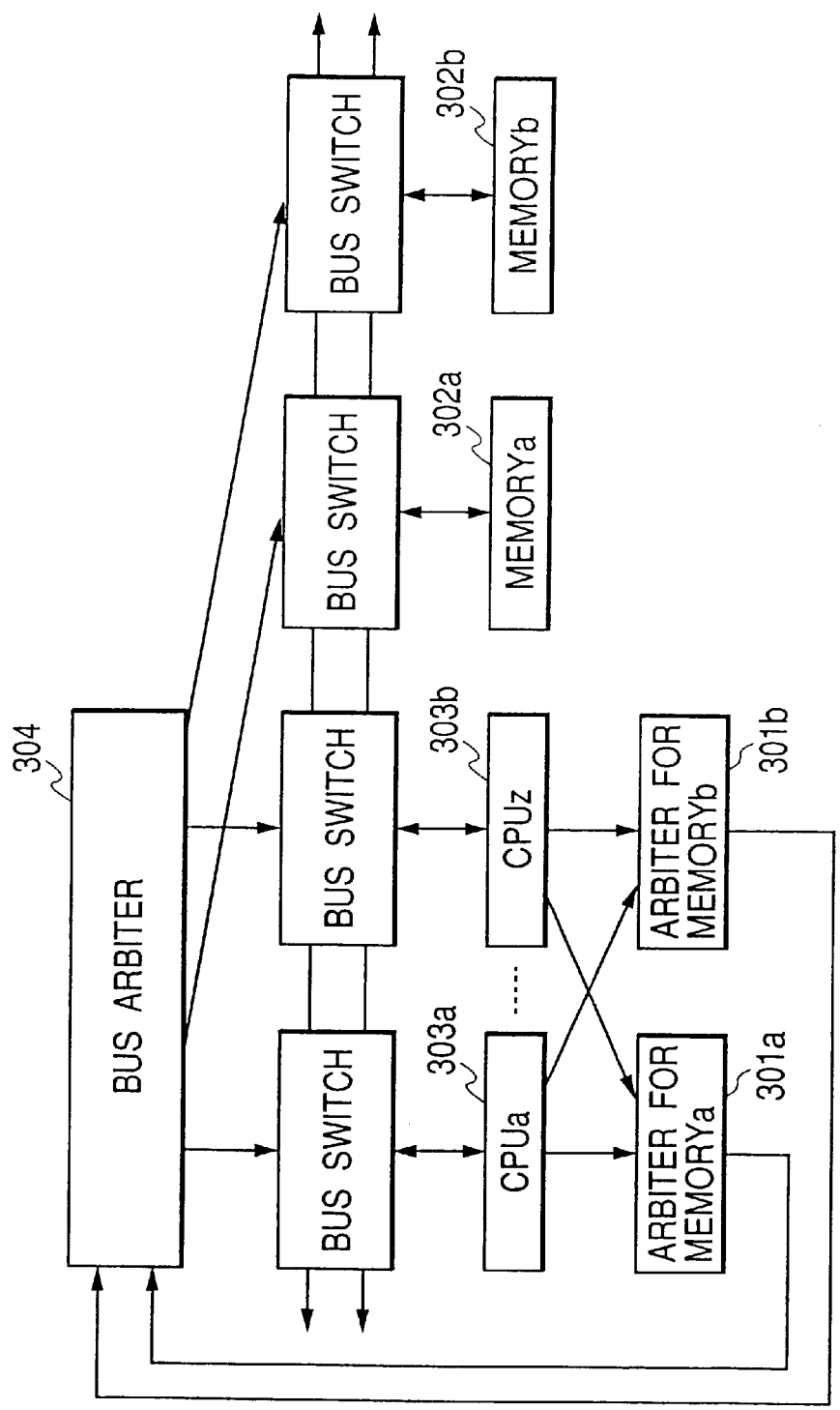
FIG. 1 shows an example of a conventional type multiple bus control device.

Embodiments of the present invention will be described below.

The present invention is characterized by the configuration of a multiple bus control device and first, to grasp the whole, embodiments of a communication device according to the present invention will be described below. The multiple bus control device in the embodiments is equivalent to an arbiter in the communication device according to the present invention. The internal configuration of the multiple bus control device is not described in the following embodiments of the communication device and only the embodiments of the multiple bus control device according to the present invention will be described below.

FIG. 5 is a block diagram showing a first embodiment of the communication device according to the present invention.

The communication device equivalent to this embodiment is comprised of a multiple bus composed of plural transmission channels 501 (transmission channels 501a, 501b, . . . , 501c; when an element 501 and plural elements represented by numbers such as 501a, 501b, . . . , 501c provided with a subscript such as a, b, . . . , c are generally called or arbitrary one of the plural elements is called, a number without a subscript is used), plural modules 51, plural sending demultiplexers 52, plural receiving multiplexers 53 and a multiple bus control device 50. The multiple bus control device 50 will be described later.

The multiple bus is composed of plural transmission channels 501 and signals can be independently communicated in each transmission channel. The multiple bus may also be provided with plural buses respectively packaged as an electric signal line and a multiplex communication medium according to an arbitrary multiplexing system such as wavelength multiplexing, spatial multiplexing, amplitude multiplexing, direction multiplexing, time division multiplexing and polarization multiplexing (only in optical transmission) in optical transmission and radio transmission can be used.

The module 51 communicates with another module via a signal line for sending data 502 and a signal line for receiving data 503. A module generally includes all devices such as CPU, a memory and an I/O interface which can be connected to a bus.

The sending demultiplexer 52 selects one of the transmission channels 501 according to a sending channel number 110 sent from the multiple bus control device 50 and connects the selected transmission channel to the sending signal line 502 from the module 51.

The receiving multiplexer 53 selects one of the transmission channels 501 according to a receiving channel number 111 sent from the multiple bus control device 50 and connects the selected transmission channel to the receiving signal line 503 from the module 51.

When communication is activated, a communication request signal 100 is first sent from the module 51 to the multiple bus control device 50 and arbitration is started. As a result, a communication enabling signal 101, a sending channel number 110 and a receiving channel number 111 are respectively input to the module 51, the sending demultiplexer 52 and the receiving multiplexer 53. Each module 51 which receives the permission of communication in the form of the communication enabling signal 101 can start data transmission from the next cycle via each transmission channel respectively selected by the sending demultiplexer 52 and the receiving multiplexer 53. According to the communication device shown in FIG. 5, a broadcast with plural sending and response destinations shown in FIG. 4 is implemented over the multiple bus.

Figure 6:
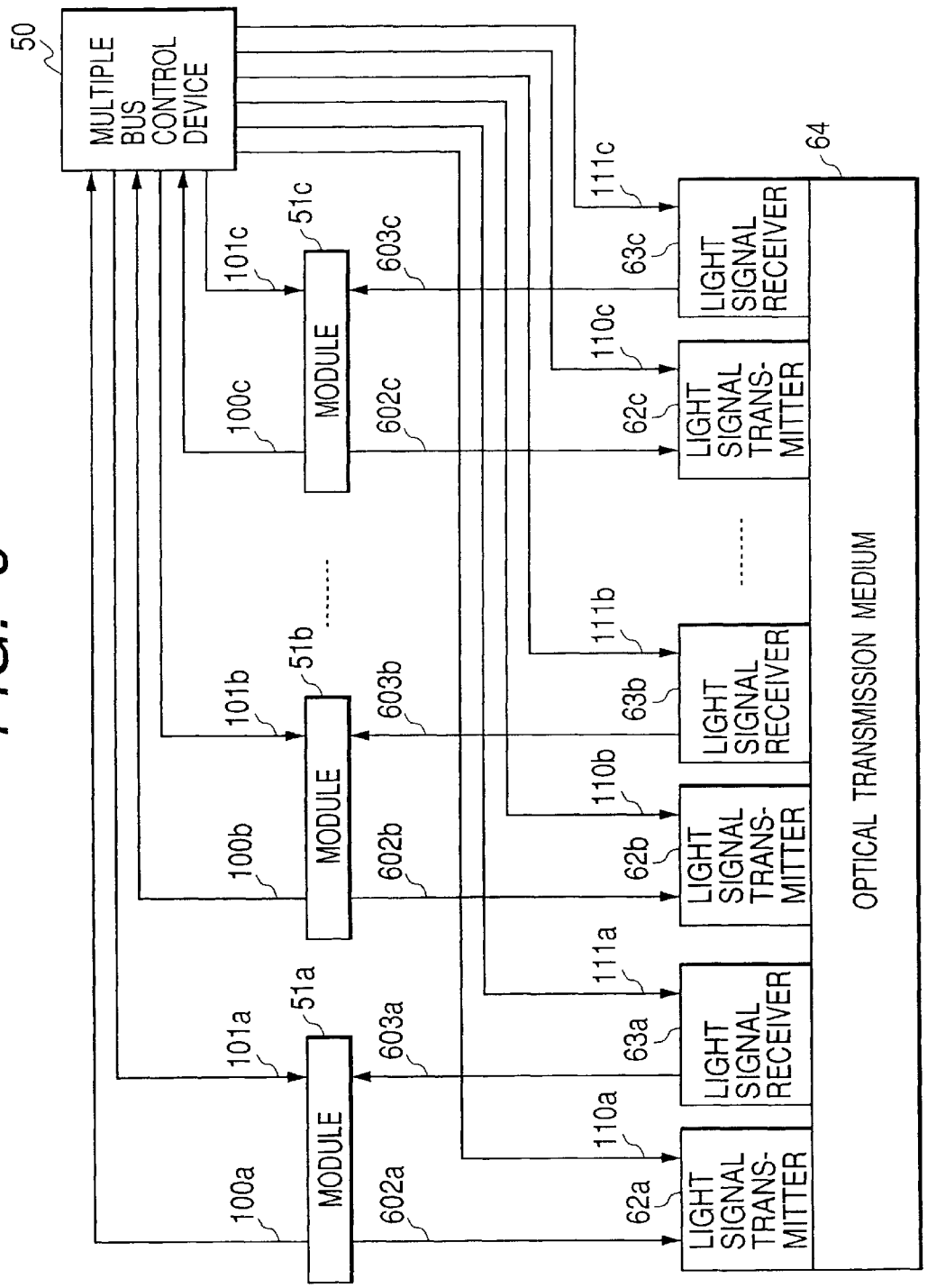
FIG. 6 is a block diagram showing a second embodiment of the communication device according to the present invention.

FIG. 6 is a block diagram showing a second embodiment of the communication device according to the present invention.

A communication device equivalent to this embodiment is composed of an optical transmission medium 64, plural modules 51, plural light signal transmitters 62, plural light signal receivers 63 and a multiple bus control device 50. The multiple bus control device 50 will be described later. As the module 51 is similar to that in the first embodiment shown in FIG. 5 of the communication device according to the present invention, the description is omitted.

The optical transmission medium 64 is provided with plural access ports for receiving or emitting signal light and multiplex communication is performed by transmitting an optical pulse inside the medium. For the optical transmission medium 64, a spatial optical transmission medium such as an optical waveguide is used. For a multiplex communication method, wavelength multiplexing, spatial multiplexing, amplitude multiplexing, polarization multiplexing, time division multiplexing and others can be applied.

Plural light signal transmitters 62 are provided and are connected to the corresponding optical transmission medium 64. In the optical transmission medium 64, at least one of available transmission channels is selected and signal light is incident upon the optical transmission medium 64. The intensity of the signal is determined based upon a sending signal 602 from the module 51. Concretely, an optical modulator such as a light emitting diode can be used.

Plural light signal receivers 63 are also provided and are connected to the corresponding optical transmission medium 64. At least one channel is selected as a light receiving channel and an outgoing beam from the optical transmission medium 64 is received via the selected channel. The value of an output signal 603 is determined based upon the quantity of light which the selected light receiving channel receives. Concretely, a photoelectric device such as a photodiode and CCD can be used.

The module 51 is connected to at least one of the light signal transmitter 62 and the light signal receiver 63.

When communication is activated, a communication request signal 100 is first sent from the module 51 to the multiple bus control device 50 and arbitration is started. The result of the arbitration is respectively input to the module 51, the light signal transmitter 62 and the light signal receiver 63 as a communication enabling signal 101, a sending channel number 110 and a receiving channel number 111. Each module 51 which receives the permission of communication via each transmission channel respectively selected by the light signal transmitter 62 and the light signal receiver 63 can start data transmission from the next cycle. In the second embodiment shown in FIG. 6, a broadcast with plural sending destinations and response destinations shown in FIG. 4 is implemented by the optical transmission medium 64.

Figure 7:
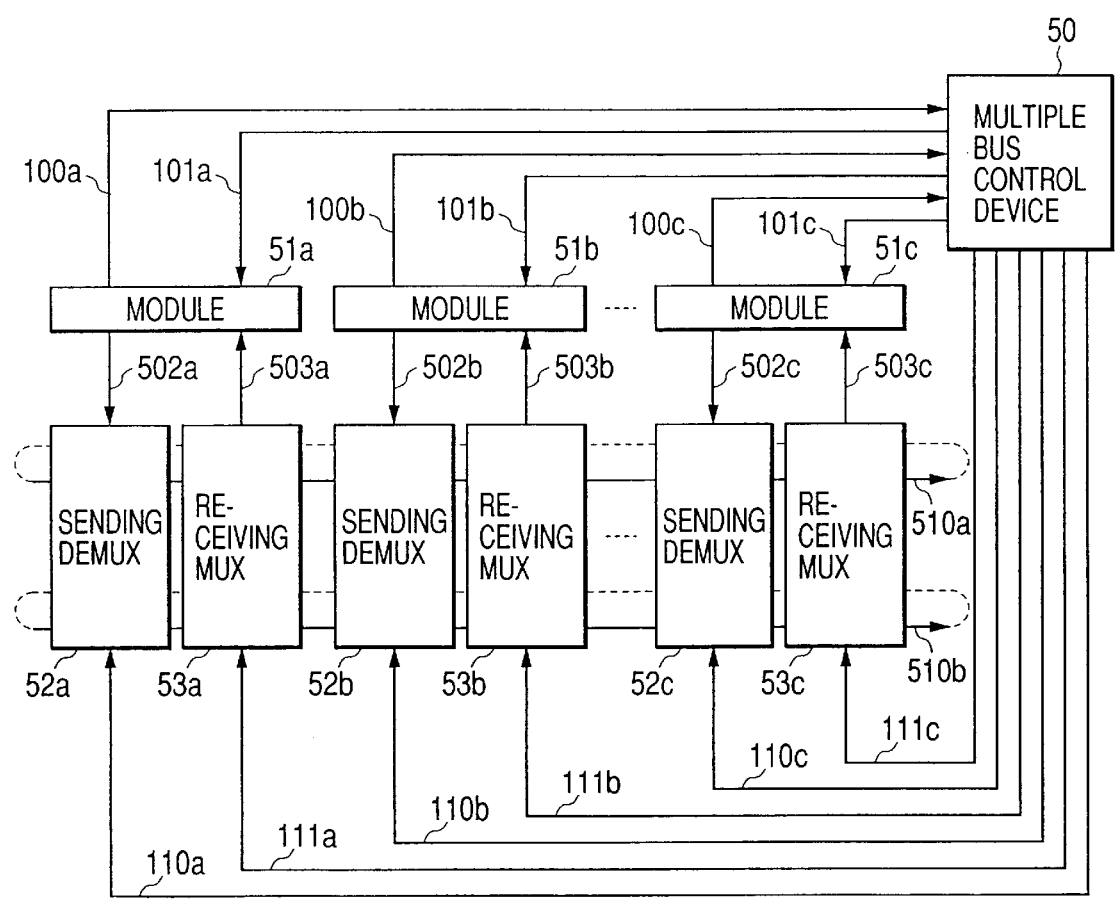
FIG. 7 is a block diagram showing a third embodiment of the communication device according to the present invention.

FIG. 7 is a block diagram showing a third embodiment of the communication device according to the present invention.

A communication device equivalent to this embodiment is comprised of a multiple ring bus composed of plural transmission channels 510, plural modules 51, plural sending demultiplexers 52, plural receiving multiplexers 53 and a multiple bus control device 50. The multiple bus control device 50 will be described later. As the module 51, the sending demultiplexer 52 and the receiving multiplexer 53 are similar to those in the first embodiment of the communication device according to the present invention described referring to FIG. 5, the description is omitted.

The multiple ring bus is composed of plural transmission channels 510 and communication can be independently performed via each transmission channel. The multiple ring bus may also be provided with plural buses respectively packaged as an electric signal line and a multiplex communication medium according to wavelength multiplexing, spatial multiplexing, amplitude multiplexing, time division multiplexing, polarization multiplexing (only in optical transmission) and others in optical transmission and radio transmission may also be used. The above multiple ring bus is different from the transmission channel 501 shown in FIG. 5 in that the plural sending demultiplexers 52 and the plural receiving multiplexers 53 are connected in torus via signal lines provided with a directional propagation property.

When communication is activated, a communication request signal 100 is first sent from the module 51 to the multiple bus control device 50 and arbitration is started. The result of the arbitration is input to the module 51, the sending demultiplexer 52 and the receiving multiplexer 53 as a communication enabling signal 101, a sending channel number 110 and a receiving channel number 111. Each module 51 can start data transmission from the next cycle via each transmission channel respectively selected by the sending demultiplexer 52 and the receiving multiplexer 53. In the third embodiment shown in FIG. 7, a broadcast with plural sending destinations and plural response destinations shown in FIG. 4 is implemented over the multiple ring bus provided with a directional propagation property.

Figure 8:
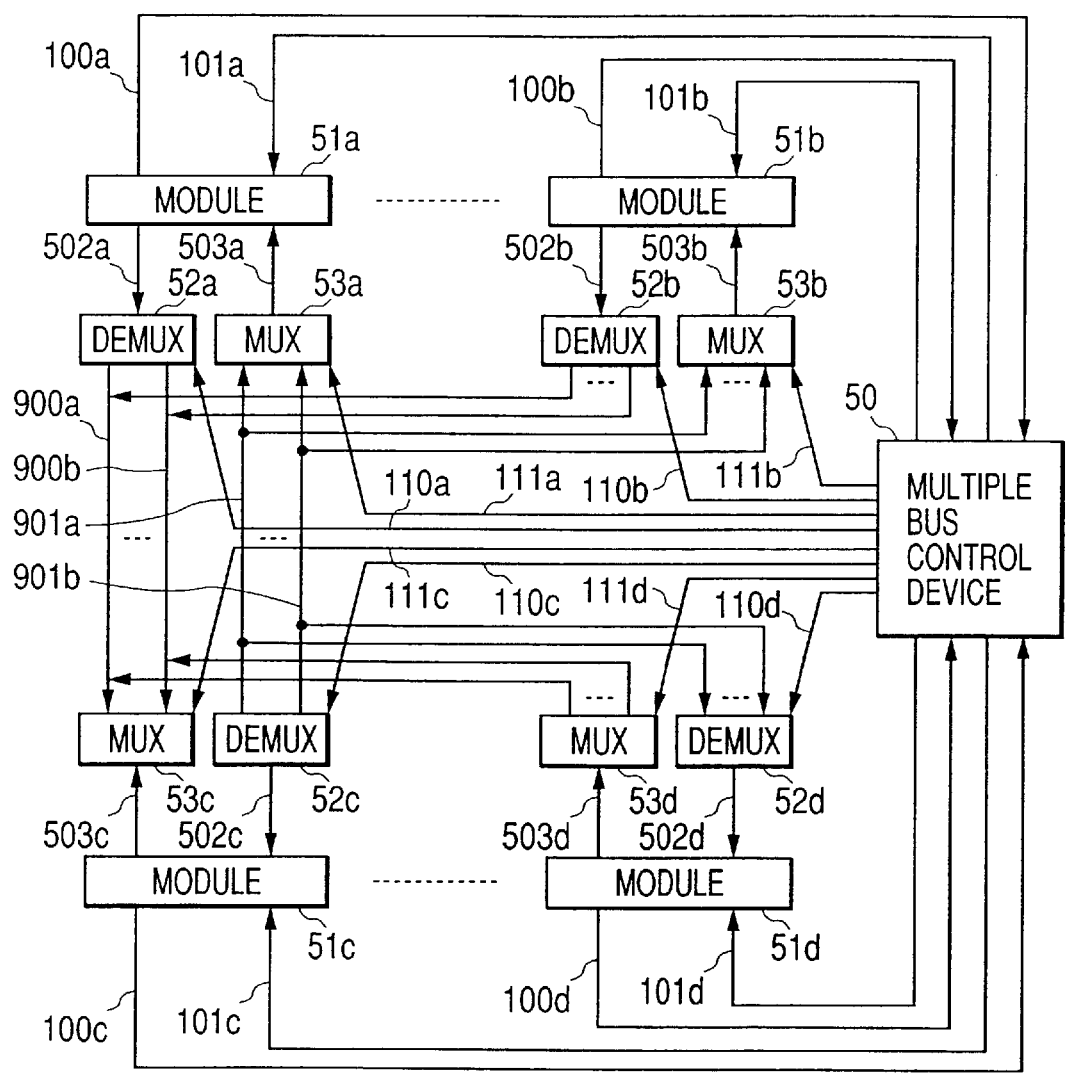
FIG. 8 is a block diagram showing a fourth embodiment of the communication device according to the present invention.

FIG. 8 is a block diagram showing a fourth embodiment of the communication device according to the present invention.

A communication device equivalent to this embodiment is comprised of a first multiple sending bus composed of plural transmission channels 900, a second multiple sending bus composed of plural transmission channels 901, a first group of modules 51a and 51b, a second group of modules 51c and 51d, plural sending demultiplexers 52, plural receiving multiplexers 53 and a multiple bus control device 50. The multiple bus control device 50 will be described later. As the module 51 is similar to that in the first embodiment shown in FIG. 5 of the communication device according to the present invention, the description is omitted.

The first multiple sending bus is composed of plural transmission channels 900 and communication can be independently performed via each transmission channel. The plural transmission channels composing the first multiple sending bus transmit a signal only in one direction. The first multiple sending bus may also be provided with plural buses respectively packaged as an electric signal line and a multiplex communication medium according to wavelength multiplexing, spatial multiplexing, amplitude multiplexing, time division multiplexing, polarization multiplexing (only in optical transmission) and others in optical transmission and radio transmission can also be used. The second multiple sending bus is also provided with the same function as the first multiple sending bus. That is, in this embodiment, the plural transmission channels 900 and 901 respectively have directivity in a direction in which a signal is transmitted.

Each of the plural modules 51 belongs to either of the first group of modules or the second group of modules and executes only communication between both groups. That is, both groups are mutually connected via the first multiple sending bus and the second multiple sending bus. The first group of modules 51a and 51b uses the first multiple sending bus for sending and the second multiple sending bus for receiving. In the meantime, the second group of modules 51c and 51d uses the second multiple sending bus for sending and the first multiple sending bus for receiving.

When signals for sending 502a and 502b from the first group of modules 51a and 51b are respectively input to the sending demultiplexers 52a and 52b, the sending demultiplexers respectively select one of the transmission channels 900a and 900b. The above selection is executed according to a sending channel number 110a or 110b sent from the multiple bus control device 50.

When signals for sending 502c and 502d from the second group of modules 51c and 51d are respectively input to the sending demultiplexers 52c and 52d, the sending demultiplexers respectively select one of the transmission channels 901a and 901b. The above selection is executed according to a sending channel number 110c or 110d sent from the multiple bus control device 50.

The receiving multiplexers 53a and 53b respectively select one of the transmission channels 901a and 901b and respectively receive signals 503a and 503b to be respectively received by the first group of the modules 51a and 51b. The above selection is executed according to a receiving channel number 111a or 111b sent from the multiple bus control device 50.

The receiving multiplexers 53c and 53d respectively select one of the transmission channels 900a and 900b and respectively receive signals 503c and 503d to be respectively received by the second group of modules 51c and 51d. The above selection is executed according to a receiving channel number 111c or 111d sent from the multiple bus control device 50.

When communication is activated, a communication request signal 100 is first sent from the module 51 to the multiple bus control device 50 and arbitration is started. The result of the arbitration is respectively input to the module 51, the sending demultiplexer 52 and the receiving multiplexer 53 as a communication enabling signal 101, a sending channel number 110 and a receiving channel number 111. Each module 51 can start data transmission from the next cycle via each transmission channel respectively selected by the sending demultiplexer 52 and the receiving multiplexer 53. In the fourth embodiment shown in FIG. 8, a broadcast with the plural sending destinations and the plural response destinations shown in FIG. 4 is implemented in a network via a multiple bus having a directional propagation property.

Figure 9:
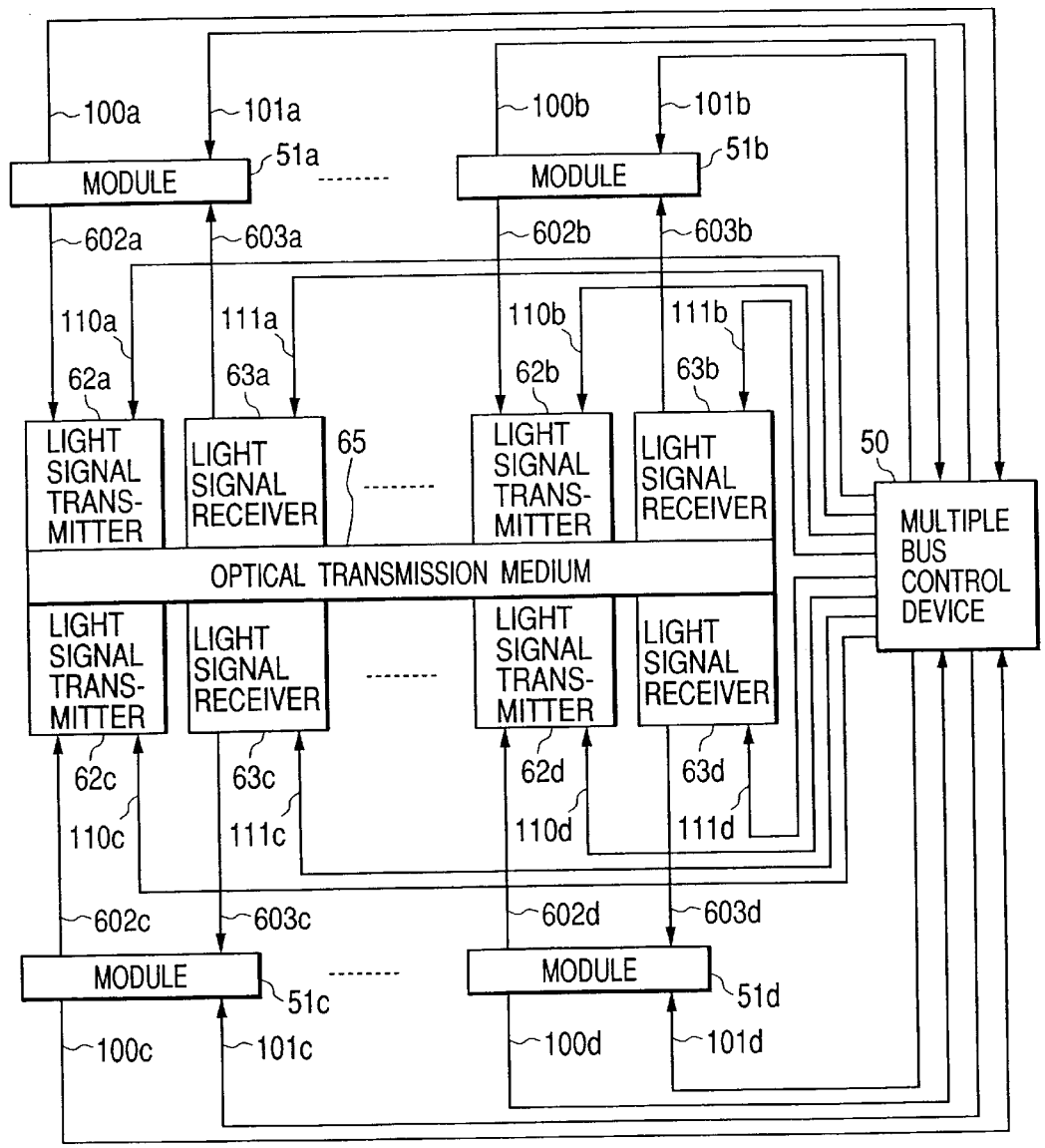
FIG. 9 is a block diagram showing a fifth embodiment of the communication device according to the present invention.

FIG. 9 is a block diagram showing a fifth embodiment of the communication device according to the present invention.

A communication device equivalent to this embodiment is composed of an optical transmission medium 65, plural modules 51, plural light signal transmitters 62, plural light signal receivers 63 and a multiple bus control device 5. The multiple bus control device 50 will be described later. As the module 51 is similar to that in the first embodiment shown in FIG. 5 of the communication device according to the present invention, and the light signal transmitter 62 and the light signal receiver 63 are similar to those in the second embodiment shown in FIG. 6 of the communication device according to the present invention, the description of them is omitted.

The optical transmission medium 65 is provided with plural access ports for receiving or emitting signal light and each access port belongs to either of a first group of access ports or a second group of access ports. As shown in FIG. 9, the light signal transmitters 62a and 62b and the light signal receivers 63a and 63b are connected to the first group of access ports, and the light signal transmitters 62c and 62d and the light signal receivers 63c and 63d are connected to the second group of access ports. Multiplex communication between both groups of access ports is performed by transmitting an optical signal inside the medium. That is, both groups of access ports are mutually connected via the optical transmission medium 65. The optical transmission medium 65 is concretely a flat optical waveguide for example and a spatial optical transmission medium inside which access ports provided to the opposite end faces can communicate is used. For a multiplex communication method, wavelength multiplexing, spatial multiplexing, amplitude multiplexing, polarization multiplexing, time division multiplexing, the combination of them and others can be used.

When communication is activated, a communication request signal 100 is first sent from the module 51 to the multiple bus control device 50 and arbitration is started. The result of the arbitration is respectively input to the module 51, the light signal transmitter 62 and the light signal receiver 63 as a communication enabling signal 101, a sending channel number 110 and a receiving channel number 111. Each module 51 can start data transmission from the next cycle via each transmission channel respectively selected by the light signal transmitter 62 and the light signal receiver 63. In the fifth embodiment shown in FIG. 9, a broadcast with the plural sending destinations and the plural response destinations shown in FIG. 4 is implemented over a multiple bus in the form of the optical transmission medium provided with a directional propagation property.

Next, an embodiment of the multiple bus control device 50 in the above embodiments shown in FIGS. 5 to 9 of the communication device according to the present invention, that is, an embodiment of the multiple bus control device according to the present invention will be described.

Figure 10:
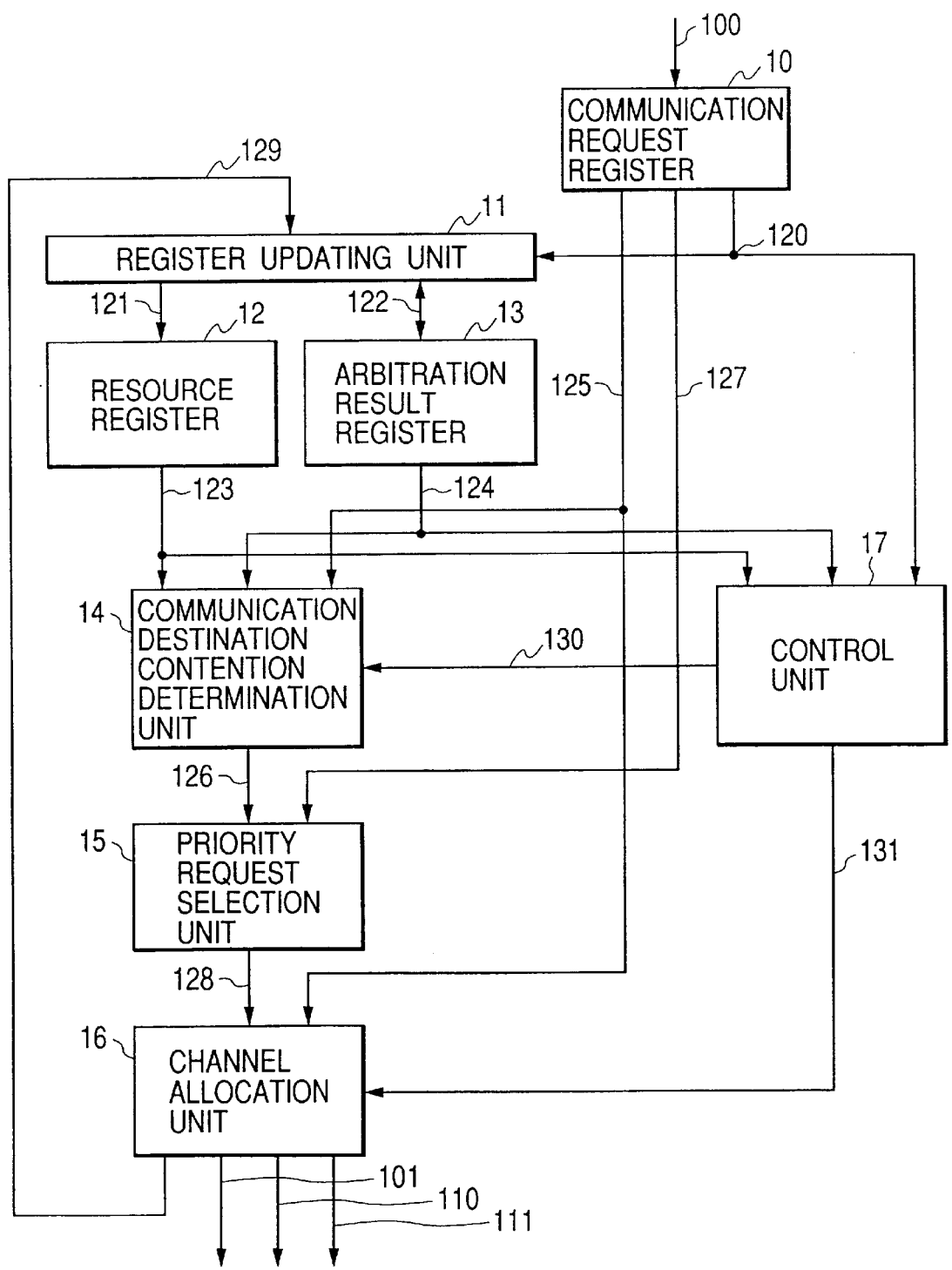
FIG. 10 is a block diagram showing a first embodiment of a multiple bus control device according to the present invention.

FIG. 10 is a block diagram showing a first embodiment of the multiple bus control device according to the present invention.

A multiple bus control device equivalent to this embodiment is composed of a communication request register 10, a register updating unit 11, a resource register 12, an arbitration result register 13, a communication destination contention determination unit 14, a priority request selection unit 15, a channel allocation unit 16 and a control unit 17. Of these, the communication request register 10 is equivalent to an example of a communication request receiving unit in the multiple bus control device according to the present invention and a complex of each element except the communication request register 10 is equivalent to an example of an arbiter in the multiple bus control device according to the present invention. In the embodiment shown in FIG. 10, a communication enabling signal 101, a sending channel number 110 and a receiving channel number 111 are generated and output based upon a communication request signal 100 input from each module connected to a multiple bus so that contention for a channel among each communication and contention in a communication destination is prevented from occurring. The above module generally includes any device which can be connected to a bus such as CPU, a memory and an I/O interface.

Figures 11, 12:
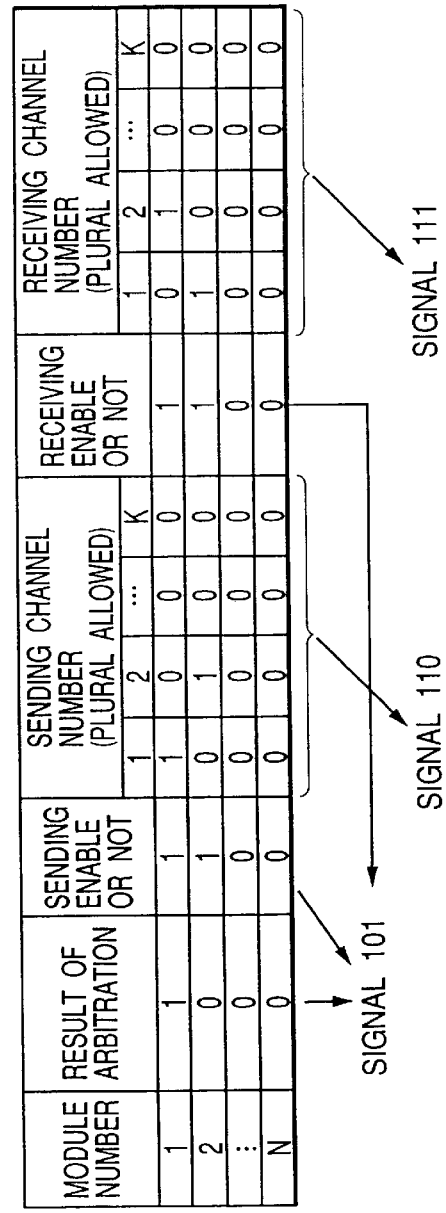
FIG. 11 shows the breakdown of a communication request signal which is an input signal in the embodiment shown in FIG. 10.
FIG. 12 shows each breakdown of a communication enabling signal, a sending channel number and a receiving channel number which are an output signal in the embodiment shown in FIG. 10.

FIG. 11 shows the breakdown of a communication request signal 100 which is an input signal in this embodiment. A communication request signal 100 is stored in the communication request register 10. Each line shows a communication request signal 100 sent from each module and each communication request signal is composed of a request flag showing whether a request is made or not, a sending destination module number showing a sending destination module for a signal to be sent, a response module number showing a response module for receiving a signal sent from the above sending destination module and responding to it, a response destination module number showing a response destination module for receiving a response from the response module, priority and a termination flag showing that communication is finished.

The request flag is necessarily turned on when each module requests communication. In FIG. 11, a value 1 shows an ON state and a value 0 shows an OFF state, however, the setting of each value may be also reverse. FIG. 11 shows an example that only the modules Nos. 1 and 2 request communication. For example, as the module No. N does not request communication, its request flag is zero and a signal to the module No. N is invalidated.

As for a sending destination and a response destination, plural modules can be both specified and hereby, multicast communication can be specified. FIG. 11 shows that a request for communication to modules the bit of which is 1 of sending destination modules is made, however, the setting of the value of a bit may also be reverse. As for a response destination, it is similar. A response module is necessarily one and is required to be specified as a sending destination module.

Priority is a criterion in selecting a request for communication in arbitration processing. In this embodiment, it is defined that the priority of a request for communication having a large value is high, however, conversely, it may also be defined that the priority of a request for communication having a small value is high. For a method of setting priority, there are the following methods.

(1) The priority of a task managed by an operating system is used. For example, the priority of communication in a task executed by an operating system is set so that it is higher than that in a task in a user program and a task the urgency of which is high is precedently processed.

(2) Time until the processing of each task is finished is calculated beforehand and higher priority is set for a shorter task.

(3) High priority is generally set for a task for data communication having much transmission quantity such animation. Setting in which the above methods are combined is also allowed.

As shown in FIG. 11, the module No. 1 requests communication with the module No. 2, however, simultaneously, the module No. 2 requests multicast communication to the modules No. 1 and No. N and the above communication cannot be simultaneously executed. In this case, as the priority of a request from the module No. 2 is '1' though the priority of a request from the module No. 1 is '2', only the request for communication from the module No. 1 is permitted. This is represented by an arbitration result signal 122 shown in FIG. 10. The arbitration result signal 122 will be described later.

The termination flag is turned on when communication by each module is finished. In FIG. 11, a value 1 shows an ON state and a value 0 shows an OFF state, however, the setting of each value may also be reverse.

FIG. 12 shows the breakdown of a communication enabling signal 101 which is an output signal in this embodiment, a sending channel number 110 and a receiving channel number 111. Each line shows the result of arbitration for a request for communication from each module, whether or not sending from each module and receiving in each module respectively from the next cycle are respectively permitted, further, the number of an available sending channel and the number of an available receiving channel. Plural sending channel numbers and plural receiving channel numbers can also be specified. This means that one module can use plural channels and a variable bandwidth bus can be implemented. Needless to say, a method of specifying only one channel simultaneously is also allowed. A bit 1 showing the result of arbitration shows that communication is permitted and a bit 0 showing the result of arbitration shows that communication is not permitted, however, the setting of bits may also be reverse.

The sending channel number and the receiving channel number shown in FIG. 12 are set corresponding to a request for communication from the module No. 1 shown in FIG. 12. That is, the above numbers are specified so that a channel 1 is used for sending from the module No. 1 to the module No. 2 and a channel 2 is used for a response from the module No. 2 to the module No. 1.

It should be noted that though the result of arbitration for the module No. 2 is 0 (not permitted), 1 (permitted) is set for the module No. 2 as to whether sending from the module No. 2 is permitted or not. This reason is that the module No. 2 is specified as a response module for a request for communication from the module No. 1. As described above, even if a request for communication is not permitted, sending or receiving in the next cycle is possible.

The description referring to FIG. 10 again will be given below.

The communication request register 10 receives and stores a communication request signal 100 sent from each module to communicate and outputs a communication destination module number 125, a priority signal 127 and a request start/termination signal 120 to each unit as shown in FIG. 11. The communication destination module number 125 is a signal composed of a sending module number, a sending destination module number, a response module number and a response destination module number. The priority signal 127 is a signal showing the priority of each request for communication. The request start/termination signal 120 is a signal composed of a request flag and a termination flag.

The resource register 12 stores a signal 121 output from the register updating unit 11. The signal 121 includes the number of unused ones of transmission channels and the number of modules communicable at the current time, the resource register 12 stores them and outputs as a signal 123.

The arbitration result register 13 stores an arbitration result signal 122 output from the register updating unit 11.

Figures 13, 14:
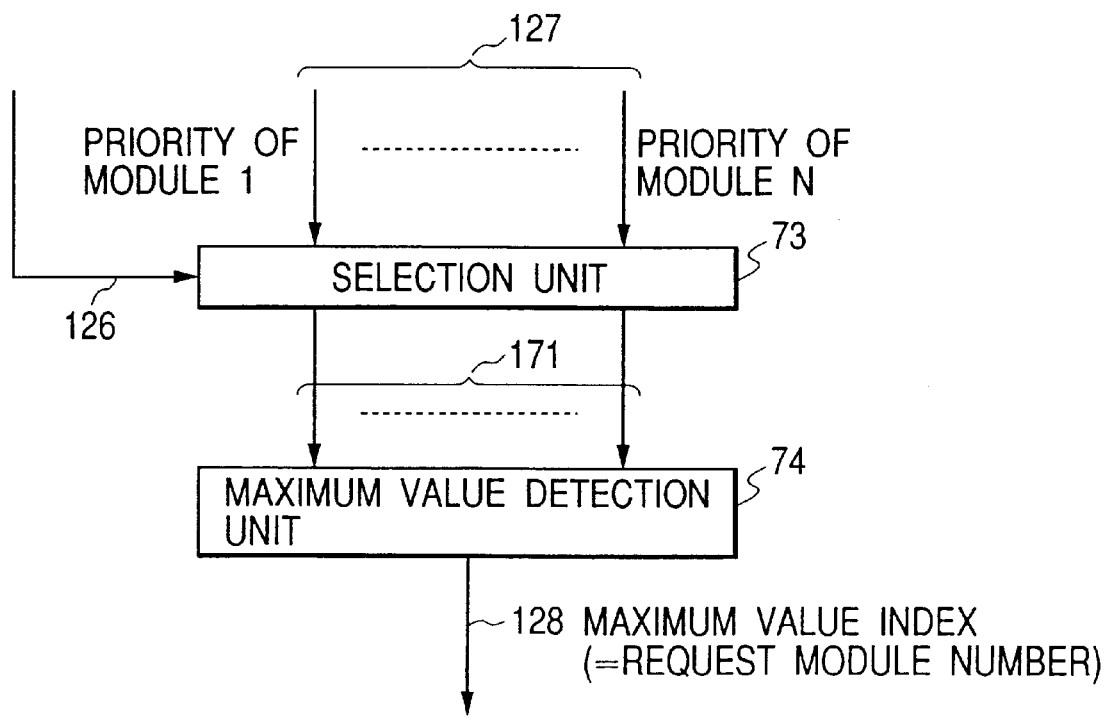
FIG. 13 shows the breakdown of an arbitration result signal stored in an arbitration result register.
FIG. 14 shows an example of the configuration of a priority request selection unit.

FIG. 13 shows the breakdown of an arbitration result signal stored in the arbitration result register 13. Each line in FIG. 13 is composed of a request flag showing whether each module requests communication or not and a permission flag showing the result of arbitration. The register updating unit 11 copies the value of each request flag shown in FIG. 11 as the value of each request flag shown in FIG. 13. A value 1 shows an ON state and a value 0 shows an OFF state, however, the setting of each value may also be reverse.

The description referring to FIG. 10 again will be given below.

The communication destination contention determination unit 14 outputs the result of collating a signal 123 output from the resource register 12, a signal 124 output from the arbitration result register 13 and a communication destination module number 125 output from the communication request register 10 as a contention flag 126. The contention flag 126 is provided by one bit for every sending module, if contention occurs at a communication destination, the value of the contention flag is '1' and if no contention occurs, the value of the contention flag is '0'. That is, when a module requests communication and a module specified as a partner of the communication in the request for communication communicates with another module, the value of the contention flag is '1'. The setting of each value may also be reverse.

Concretely, requests for communication the permission flag of which is '0' though each request flag is '1' are first selected based upon a signal 124 shown in FIG. 10 and each corresponding communication destination is selected based upon a communication destination module number 125 shown in FIG. 11. Next, each sending destination module number and each response destination module number are collated with the contents of a signal 123, it is determined whether a state of its communication destination is in contention or not and a signal 126 including information that a contention flag corresponding to a request for communication which cannot be communicated is '1' and a contention flag corresponding to a request for communication except the above is '0' is output.

The priority request selection unit 15 receives the contention flag 126 and a priority signal 127, selects one request for communication the contention flag of which is '0' and the value of priority of which is maximum and outputs as a priority request signal 128.

FIG. 14 shows an example of the configuration of the priority request selection unit 15 and referring to FIG. 14, the following description will be given.

A selection unit 73 selects priority signals 127 corresponding to requests for communication of which the contention flag 126 is '0' out of priority signals 127 showing priority sent from each module and outputs as a signal 171. The selection unit outputs a signal 171 of which the value is '0' for a module corresponding to a request for communication of which the contention flag 126 is '1'.

A maximum value detection unit 74 acquires a maximum value based upon the signal 171 and outputs an index corresponding to the maximum value as a signal 128. The above index means the number of a module which makes a request for communication the priority of which is maximum.

The description referring to FIG. 10 again will be given below.

The channel allocation unit 16 receives the priority request signal 128 and a communication destination module number 125, sends an idle transmission channel number to a sending module, a sending destination module, a response module and a response destination module respectively corresponding to the priority request signal 128 and outputs the result to an external device. Specifically, the channel allocation unit generates signals 101, 110 and 111 shown in FIG. 12. The channel allocation unit also instructs the register updating unit 11 to update the resource register 12 and the arbitration result register 13 by a signal 129.

The register updating unit 11 updates each contents of the resource register 12 and the arbitration result register 13 according to signals respectively output from the communication request register 10 and the channel allocation unit 16. That is, the register updating unit 11 receives a channel number newly allocated by the channel allocation unit 16 and each module number in the form of a signal 129, and updates the resource register 12 by outputting a signal 121. Further, the register updating unit 11 receives the address in the arbitration result register 13 corresponding to a request for communication newly permitted by the channel allocation unit 16 in the form of the signal 129, outputs a signal 122 and turns the corresponding permission flag shown in FIG. 13 in the arbitration result register 13 to 1. Further, the register updating unit 11 regularly monitors the communication request register 10 based upon a communication start/termination signal 120, outputs a signal 122, reads the contents of the arbitration result register 13, compares them and detects whether a request for communication is newly made or not and whether communication is finished or not. If the termination of communication is detected, the register updating unit updates the resource register 12 by outputting a signal 121 to change a channel number and each module number respectively used for the communication from a busy state to a free state and turns each value of the corresponding permission flag and request flag respectively in the arbitration result register 13 to 0 by outputting a signal 122.

If a new request for communication is detected based upon the communication start/termination signal 120, the register updating unit copies the value of the request flag shown in FIG. 11 by outputting a signal 122 in the arbitration result register 13.

The control unit 17 determines whether a new request for communication is made or not based upon the request start/termination signal 120 and if no new request for communication is made, the control unit 17 outputs a signal 131 and instructs the channel allocation unit 16 not to update an output signal.

The control unit 17 also determines whether any more channel can be allocated or not based upon the signal 123 stored in the resource register 12 and the signal 124 stored in the arbitration result register 13. For example, if any of the following conditions is met, it is determined that a new channel cannot be allocated. In this case, the control unit outputs a signal 131 and also instructs the channel allocation unit 16 not to update an output signal.

(1) It is determined referring to a signal 123 output from the resource register 12 that there is no idle transmission channel.

(2) It is determined referring to a signal 124 output from the arbitration result register 13 that there is no request for communication the request flag of which is '1' and the permission flag of which is '0'.

(3) If the above (1) and (2) are not met, the control unit 17 outputs signals 130 and 131 and instructs arbitration processing again.

Figure 15:
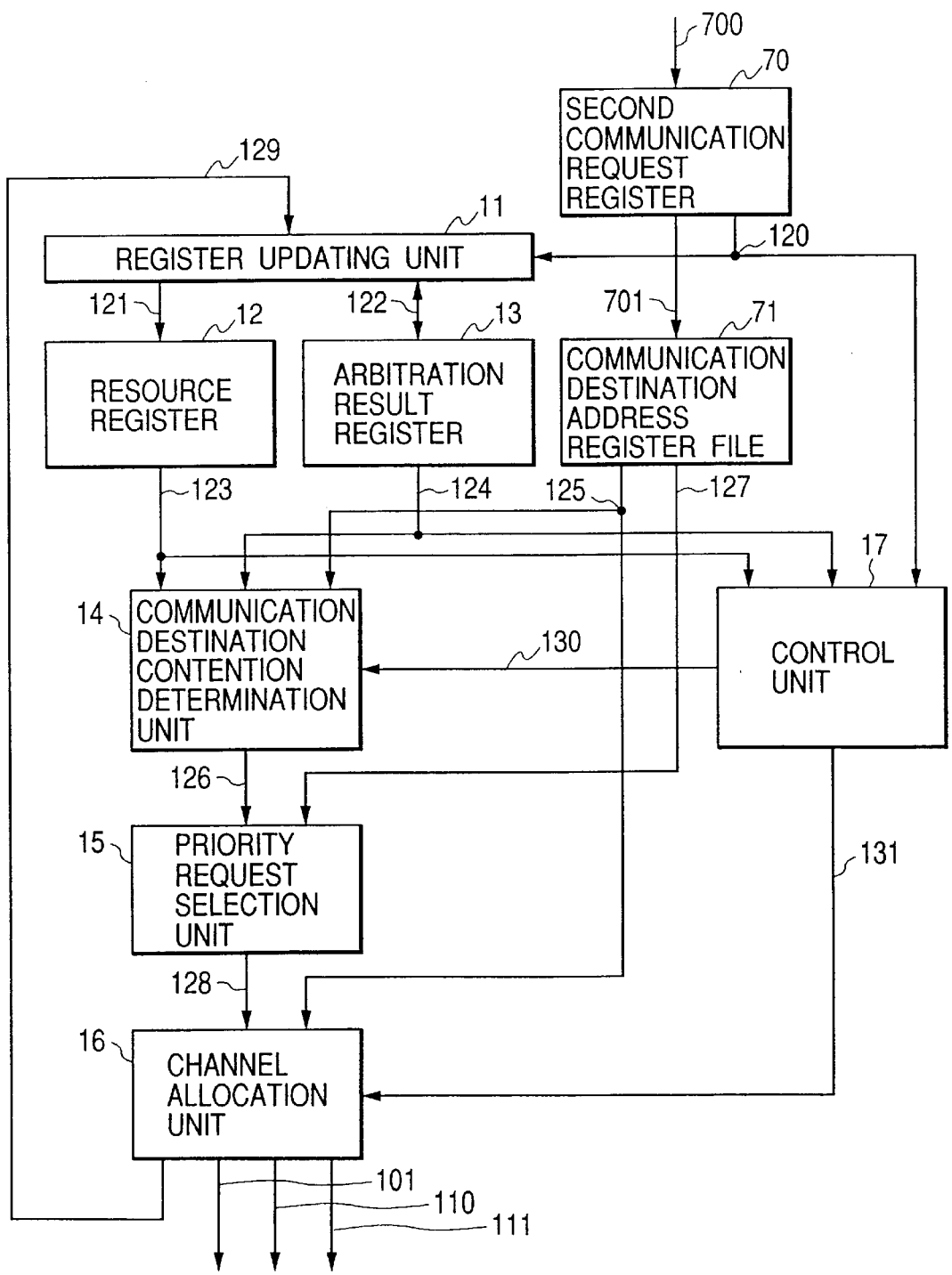
FIG. 15 is a block diagram showing a second embodiment of the multiple bus control device according to the present invention.

FIG. 15 is a block diagram showing a second embodiment of the multiple bus control device according to the present invention.

A multiple bus control device equivalent to this embodiment further comprises a second communication request register 70 and a communication destination address register file 71. As components except these are similar to those in the first embodiment, the description is omitted.

The multiple bus control device equivalent to this embodiment receives a second communication request signal 700 from each module connected via a multiple bus, generates and outputs a communication enabling signal 101, a sending channel number 110 and a receiving channel number 111 so that the contention of a channel between/among each communication and contention at a communication destination do not occur.

If the multiple bus control device shown in FIG. 15 is adopted as the multiple bus control device 50 in the embodiments shown in FIGS. 5 to 9 of the communication device, a second communication request signal 700 described below is input from each module 51 to the multiple bus control device 50 in place of the communication request signal 100 described referring to FIGS. 10 and 11.

FIG. 16 shows the breakdown of the second communication request signal 700 which is an input signal in this embodiment and FIG. 17 shows the breakdown of a communication destination address register file 71. Referring to FIGS. 16 and 17, the input signal and the communication destination address register file 71 respectively in this embodiment will be described below.

Each line in FIG. 16 shows a second communication request signal 700 individually sent from each module and the second communication request signal 700 is composed of an address for reading the communication destination address register file 71, a request flag showing whether a request is made or not and a termination flag. As the request flag and the termination flag are similar to those shown in FIG. 11, the description is omitted. The communication destination address register file 71 is accessed based upon a communication destination address register file address and the communication destination address of each module is read in parallel.

The contents of the communication destination address register file 71 shown in FIG. 17 are equivalent to the extracted fields of a sending destination module, a response module, a response destination module and priority in the communication request signal 100 shown in FIG. 11. In the first embodiment described referring to FIG. 10, these are included in the communication request signal 100 and are sent from each module when communication is requested, while this embodiment is different in that the contents of the above fields are stored in the communication destination address register file 71 before communication is requested. The above communication destination address register file 71 is equivalent to an example of a storage for storing a corresponding table in the present invention. In this case, when communication with a specific communication destination is frequently performed, the quantity of signals required for a request for communication is reduced.

The description referring to FIG. 15 again will be given below.

The second communication request register 70 receives and stores a second communication request signal 700, outputs a request flag and a termination flag as a request start/termination signal 120 and also outputs an address for reading the communication destination address register file 71 as a signal 701. The request start/termination signal 120 is similar to that in the first embodiment shown in FIG. 10.

The communication destination address register file 71 is accessed based upon the signal 701 as the address, the communication destination address and the priority of each module are read in parallel and are respectively output as signals 125 and 127. The signals 125 and 127 are also similar to those in the first embodiment.

Figure 18:
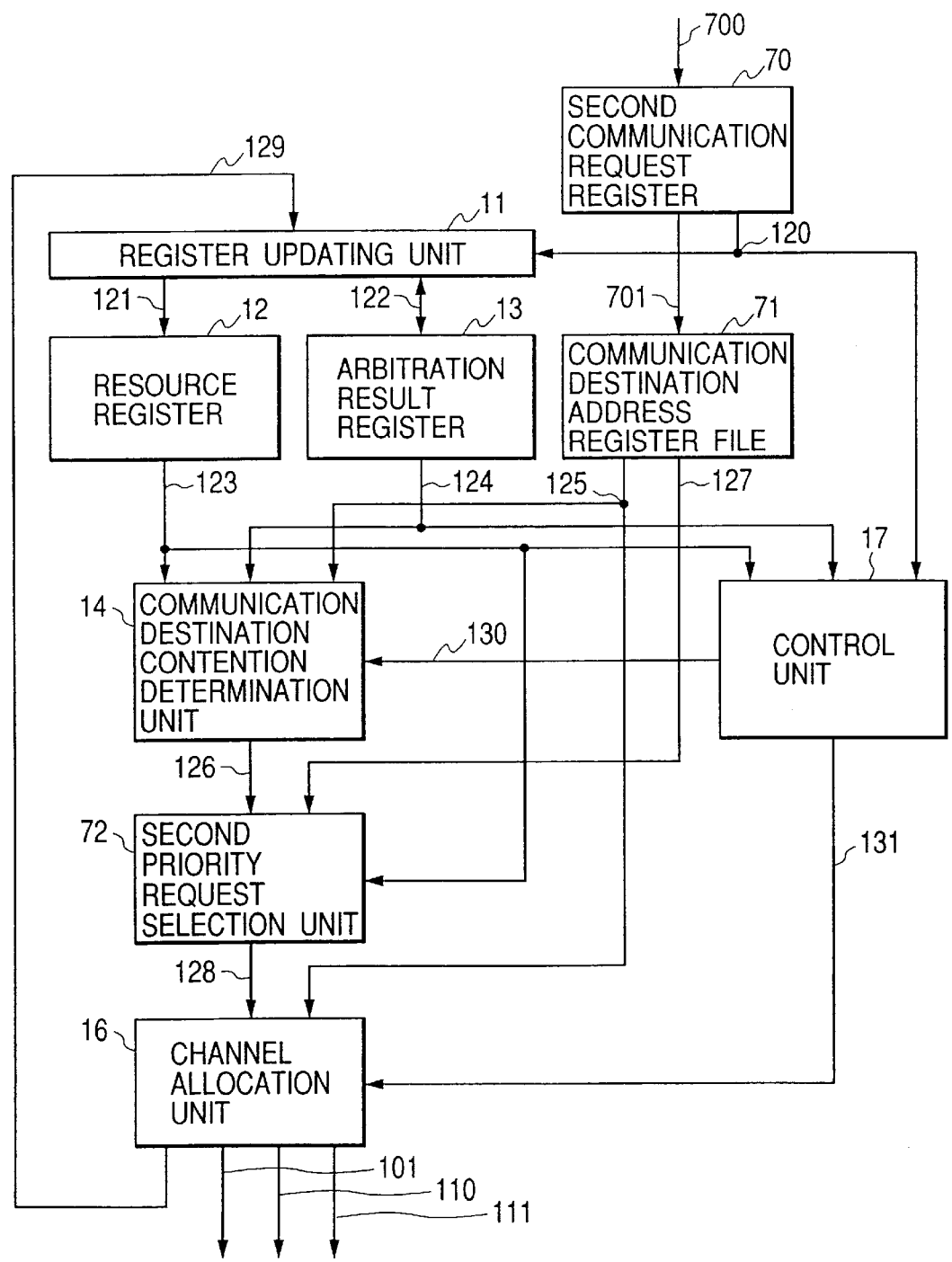
FIG. 18 is a block diagram showing a third embodiment of the multiple bus control device according to the present invention.

FIG. 18 is a block diagram showing a third embodiment of the multiple bus control device according to the present invention. This embodiment is similar to the second embodiment except that a second priority request selection unit 72 is provided in place of the priority request selection unit 15 in the second embodiment shown in FIG. 15.

The second priority request selection unit 72 receives a contention flag 126, a priority signal 127 and a signal 124 output from an arbitration result register 13, selects one communication request the contention flag of which is '1' and the value of the priority of which is maximum and outputs as a priority request signal 128.

Figure 19:
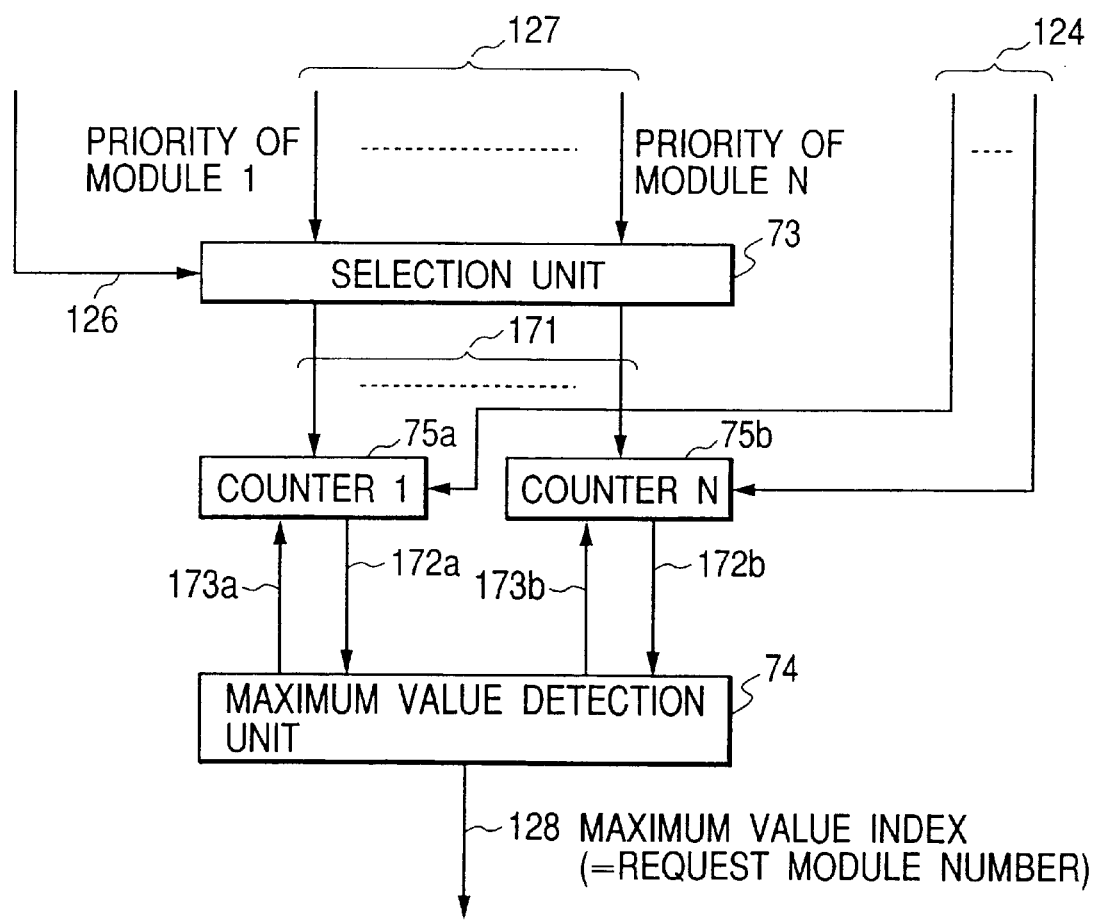
FIG. 19 is a block diagram showing an example of the configuration of a second priority request selection unit.

FIG. 19 is a block diagram showing an example of the configuration of the second priority request selection unit 72. As components except a counter 75 in this example of the configuration are similar to those in the example of the configuration shown in FIG. 14 of the priority request selection unit 15 in the first embodiment shown in FIG. 10, the description is omitted.

The counter 75 is provided corresponding to all modules that request communication. These counters 75 respectively output the value of a signal 171 output from a selection unit 73 loaded as an initial value or a value acquired by incrementing the current value as a signal 172. In these counters 75, loading, increment or the maintenance of a state is selected based upon signals 124 and 173 as follows.

(1) If the value of a request flag is 1, the value of a permission flag is 0 and a corresponding module is not selected by a maximum value detection unit 74 (determined based upon the signal 173), increment is selected.

(2) If a request flag is turned from 0 to 1, loading is selected.

(3) In a case except the above, the maintenance of a state is selected.

The above (1) corresponds to a state in which a request is not permitted and the above (2) corresponds to a state in which a new request is made.

If communication is not permitted because of contention with another request for communication though a request for communication is made, arbitration between the request for communication and a new request for communication made later is performed again. However, in the next arbitration, as the value of the priority of the request for communication which is not permitted in the preceding arbitration is incremented and becomes high, probability that the request for communication wins contention and acquires a transmission channel becomes high. Hereby, a situation that only a request for communication of a specific module is accepted can be prevented and deadlock can be prevented from being caused. All modules can utilize a multiple bus approximately uniformly.

Figure 20:
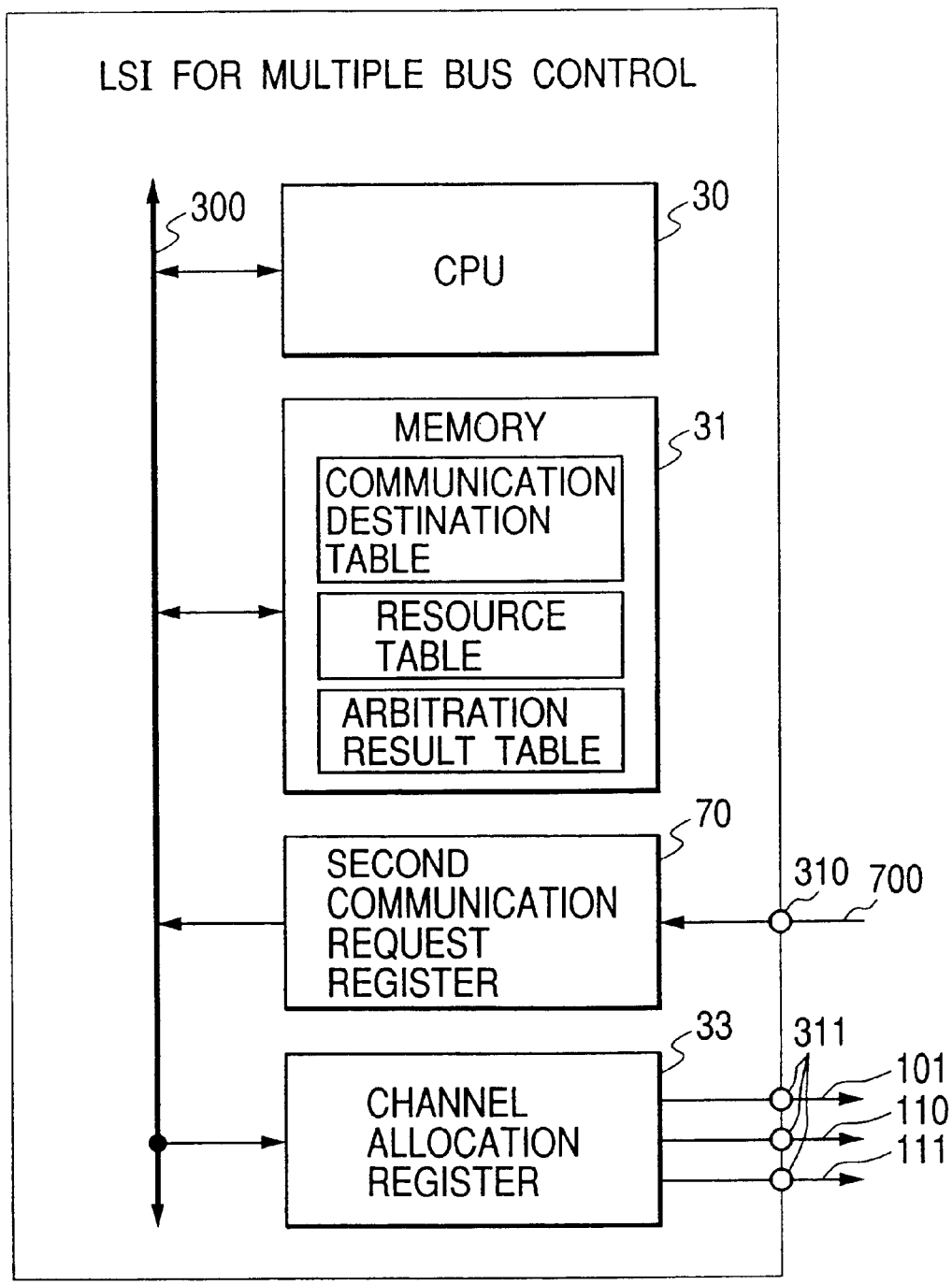
FIG. 20 is a block diagram showing a fourth embodiment of the multiple bus control device (LSI for controlling a multiple bus) according to the present invention.

FIG. 20 is a block diagram showing a fourth embodiment of the multiple bus control device according to the present invention. A multiple bus control device equivalent to this embodiment is composed of CPU 30 for bus control, a memory 31, a second communication request register 70 and a channel allocation register 33 and each is mutually connected via a dedicated bus 300. The multiple bus control device shown in FIG. 20 is realized by LSI and is equivalent to an embodiment of LSI for controlling a multiple bus according to the present invention.

The second communication request register 70 receives and stores a second communication request signal 700 from each module input via an input terminal 310 and outputs it to the bus 300.

The channel allocation register 33 is equivalent to the channel allocation unit 16 in the second embodiment shown in FIG. 15, stores the result of arbitration sent via the bus 300 and respectively outputs a communication enabling signal 101, a sending channel number 110 and a receiving channel number 111 via output terminals 311.

In the memory 31, a communication destination table, a resource table and an arbitration result table are stored. The contents of each table are similar to each contents of the communication destination address register file 71, the resource register 12 and the arbitration result register 13 in the second embodiment shown in FIG. 15.

Figures 21, 21A:
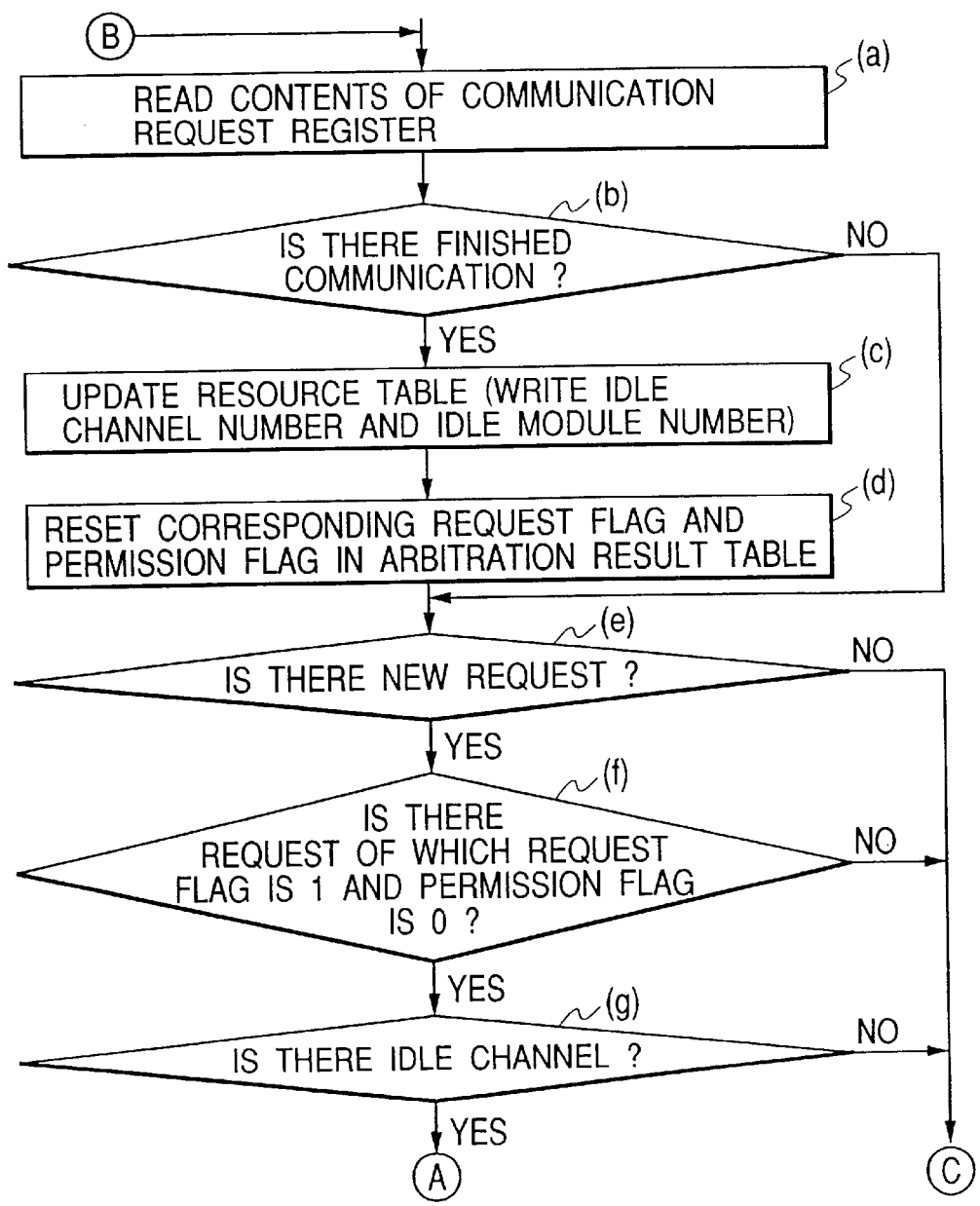
FIGS. 21 is a flow chart combining FIGS. 21A and 21B.
FIGS. 21A and 21B are flowcharts showing software run in the multiple bus control device shown in FIG. 20.
Figure 21B:
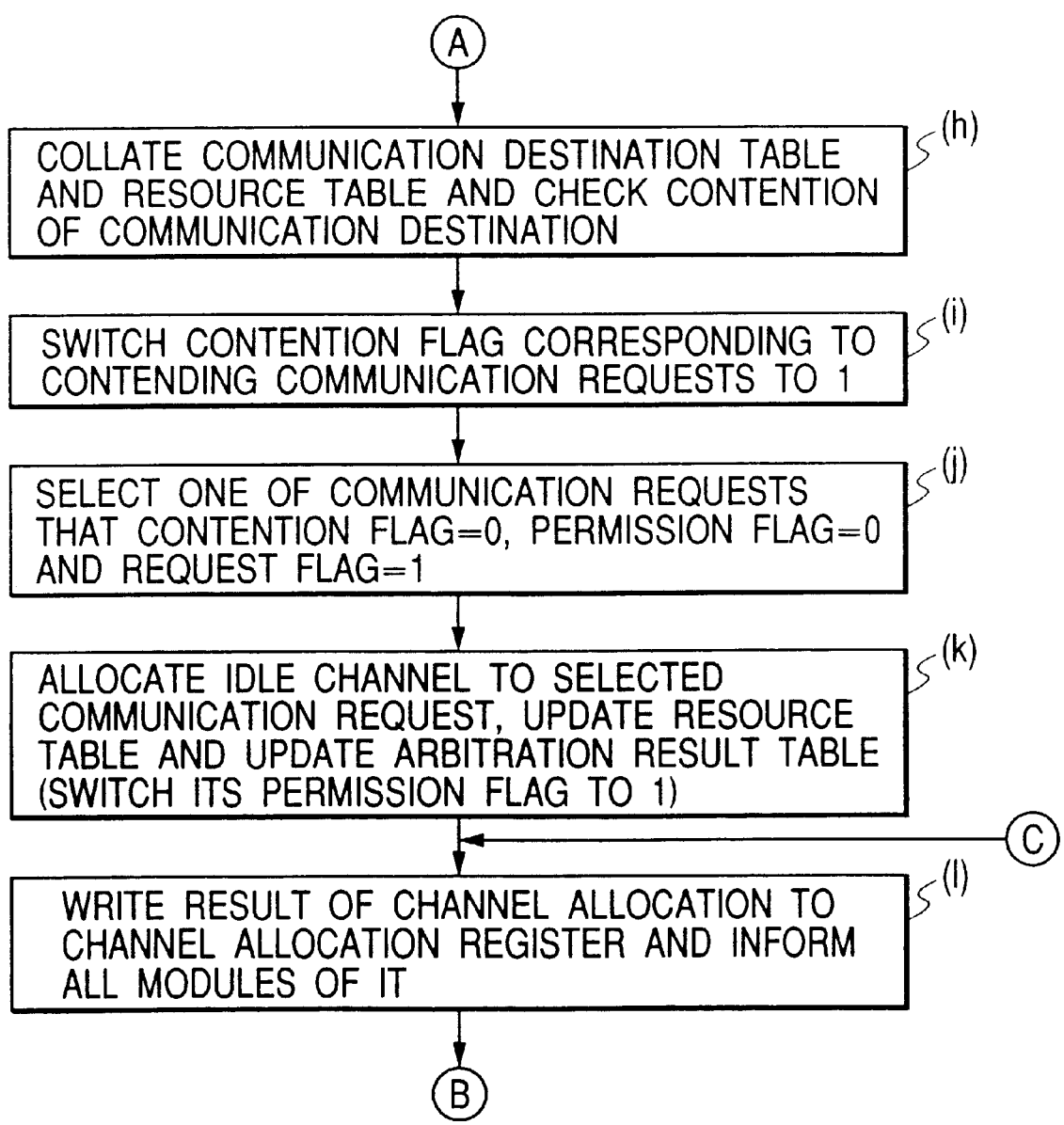

CPU 30 accesses to the memory 31, the communication request register 32 and the channel allocation register 33 via the bus 300 and executes processing as shown in a flowchart shown in FIG. 21. A permission flag, a request flag and a contention flag in the flowchart shown in FIG. 21 are similar to those included in the embodiments shown in FIGS. 10, 15 and 18.

In this embodiment, the control of the multiple bus can be realized by software operated in an LSI chip.

The flowchart shown in FIG. 21 will be described below. The flowchart shown in FIG. 21 is acquired by realizing the similar function to that in the second embodiment shown in FIG. 15 by software and as the description of the function itself overlaps with the above description, the flowchart shown in FIG. 21 will be briefly described below.

The second communication request register 70 shown in FIG. 20 receives a second communication request signal 70 from each module at any time and stores them.

In a step (a) in the flowchart shown in FIG. 21, the contents shown in FIG. 16 of the communication request register 70 are read and are written to the above software, and in a step (b), it is determined whether communication newly finished exists or not. When no communication newly finished exists, processing proceeds to a step (e).

When communication newly finished exists, processing proceeds to a step (c) and the resource table is updated. Specifically, a channel and a module respectively used in communication finished this time are registered as an idle channel and an idle module. Next, in a step (d), the corresponding request flag and permission flag in the arbitration result table shown in FIG. 13 are updated to a value 0.

In a step (e), it is determined based upon the contents of the communication request register whether communication is requested or not. When no new request for communication is made, processing proceeds to a step (1) and the result of allocating a channel so far is stored as it is.

Figure 2:
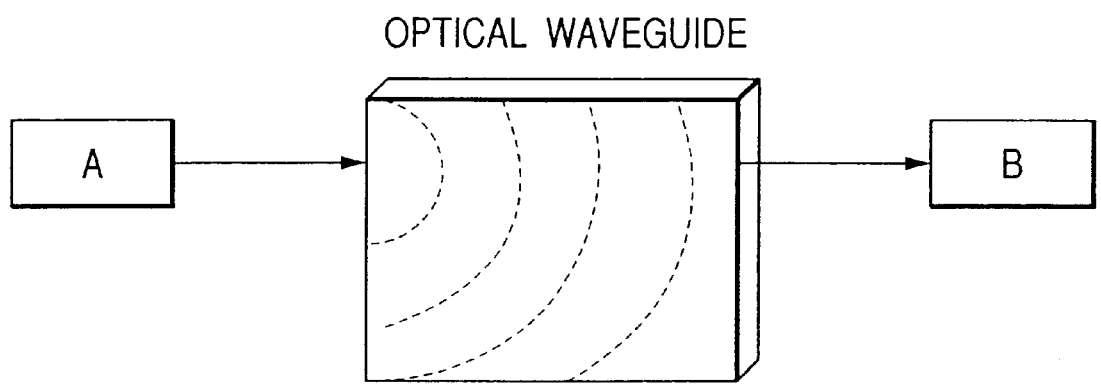
FIG. 2 is a schematic drawing showing a state of the transmission of an optical signal having a directional propagation property.
Figure 3:
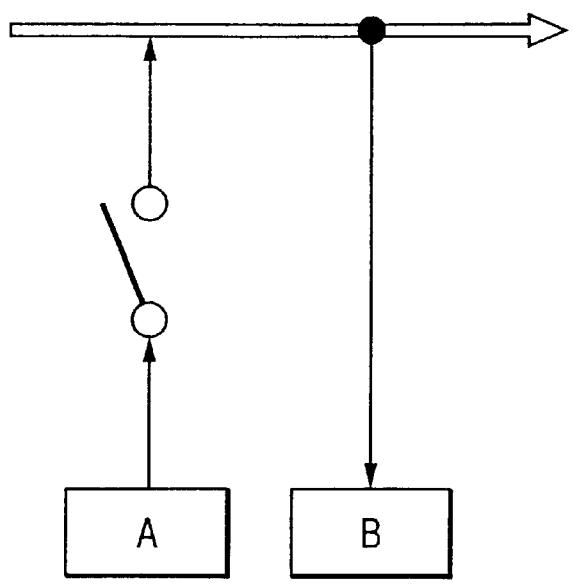
FIG. 3 equivalently represents the directional propagation property shown in FIG. 2 by an electric circuit.

When it is determined in the step (e) that a request for communication is newly made, processing proceeds to a step (f) and it is determined whether or not a request the request flag of which is '1' and the permission flag of which is '0' exists. The request of which the request flag is '1' and the permission flag is '0' means a request for communication which is not permitted yet. When such a request is not made, processing proceeds to the step (1). In the meantime, when such a request is made, processing next proceeds to a step (g) and it is determined whether an idle channel exists or not. When no idle channel exists, processing proceeds ahead. When an idle channel exists, the communication destination table is checked in a step (h), contention at a communication destination is checked, contention flags corresponding to requests for communication which contend are turned to a value 1 in a step (i), one of requests for communication of which the contention flag is '0', the permission flag is '0' and the request flag is '1' is selected in a step (j), an idle channel is allocated to the selected request for communication in a step (k), the resource table is updated and further, the arbitration result table is updated. In the step (1), the result of new channel allocation this time is written to the channel allocation register 33 shown in FIG. 2 and is informed all modules.

Figure 23:
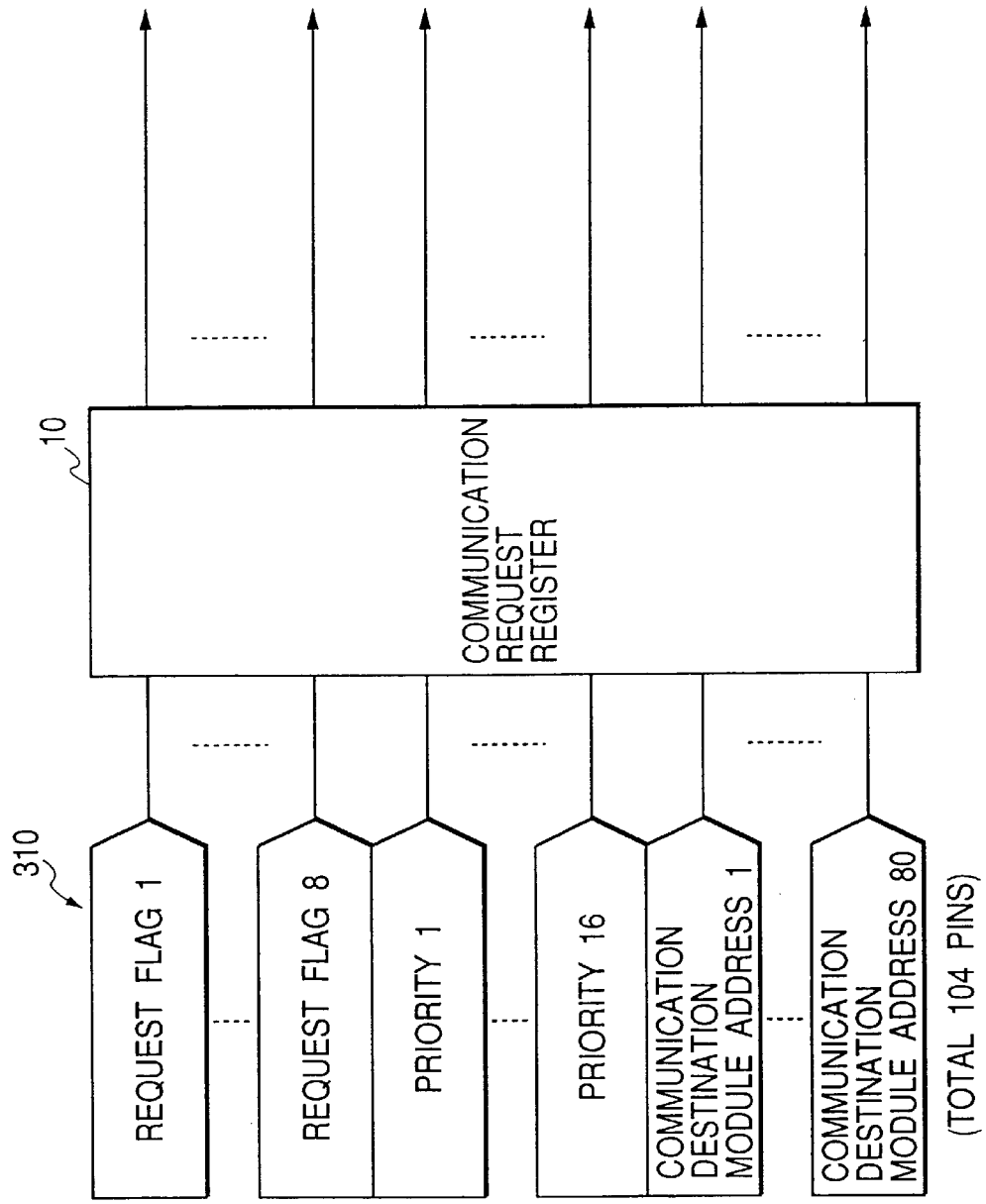
FIG. 23 is a schematic drawing showing a signal input part of the following LSI in case the multiple bus control device shown in FIG. 10 is realized by LSI.

FIG. 22 is a schematic drawing showing a signal input part of an LSI for controlling the multiple bus shown in FIG. 20 and FIG. 23 is a schematic drawing showing a signal input part of the following LSI in case the multiple bus control device shown in FIG. 10 is realized by LSI.

The number of input pins composing input terminals 310 will be examined below. The following premises are made (refer to FIGS. 11 and 16).

(1) As shown in FIG. 9 for example, the modules 51 are classified into two groups of modules 51a and 51b and modules 51c and 51d, are composed so that one group can communicate with only the other group and four modules (total 8 ports) respectively exist in each group of modules.

(2) A request flag is composed of total 8 bits by one bit per port.

(3) Priority is composed by total 16 bits by two bits per port.

(4) A communication destination address is composed of total 80 bits of 4 bits for a sending destination per port, two bits for a response module and 4 bits for a response destination.

(5) An address of a communication destination address register file is composed of total 8 bits by one bit per port.

When such premises are made, the number of input pins composing the input terminals 310 is total 16 pins acquired by adding (2) and (5) in the case of FIG. 22, is total 104 pins acquired by adding (2), (3) and (4) in the case of FIG. 23 and it proves that in the embodiment of an LSI for controlling the multiple bus according to the present invention provided with the communication destination address register file 71, the number of the input pins can be greatly reduced.

Figure 24:
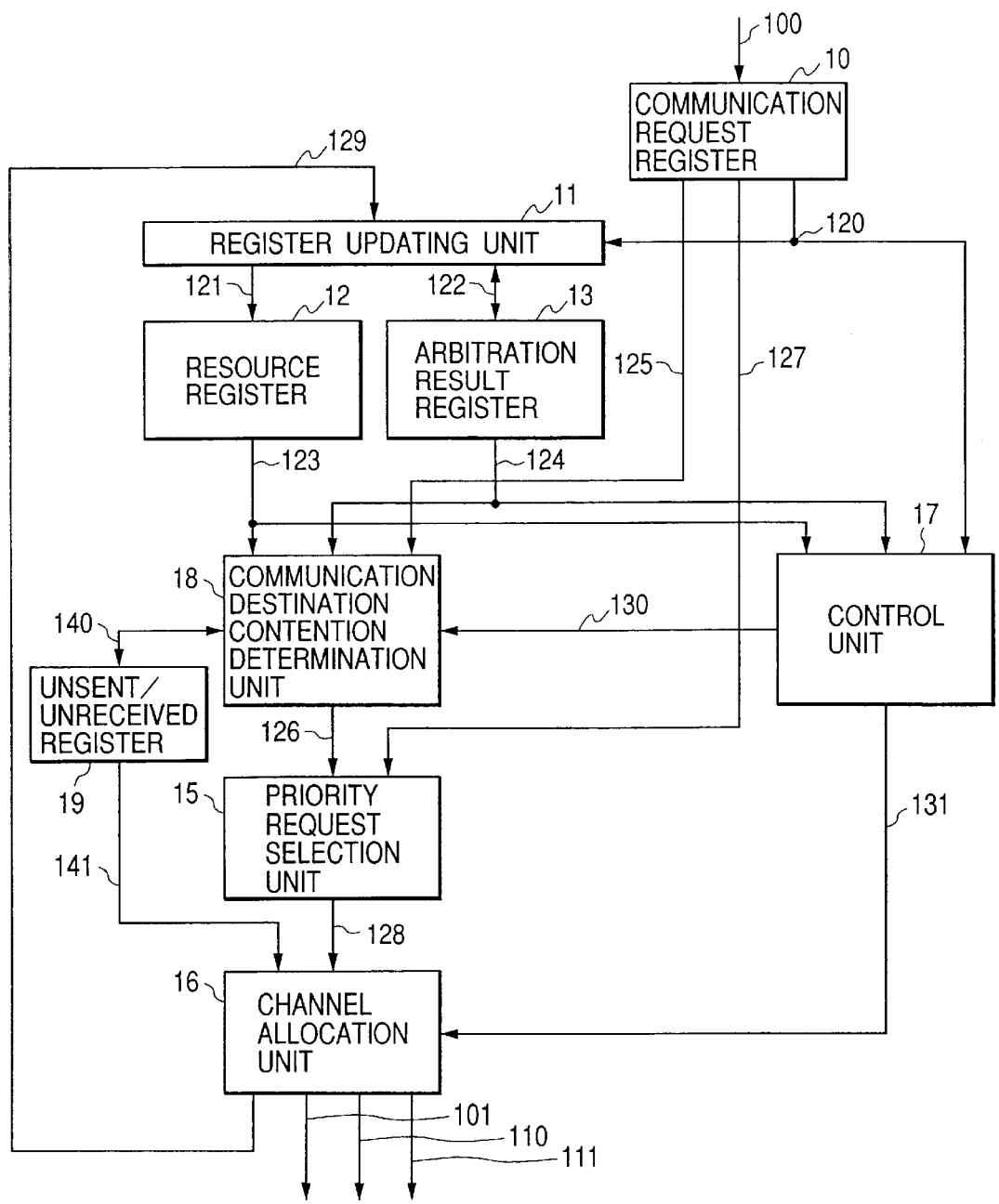
FIG. 24 is a block diagram showing a fifth embodiment of the multiple bus control device according to the present invention.

FIG. 24 is a block diagram showing a fifth embodiment of the multiple bus control device according to the present invention, FIG. 25 shows the breakdown of a communication enabling signal 101 which is an output signal in this embodiment, a sending channel number 110 and a receiving channel number 111 and FIG. 26 shows the breakdown of an arbitration result signal stored in an arbitration result register 13. FIGS. 25 and 26 are equivalent to FIGS. 12 and 13 shown in relation to the first embodiment described referring to FIGS. 10 to 14.

In the first embodiment described referring to FIGS. 11 to 14, if according to received communication request information, all partners of communication specified in the communication request information are in an idle state in which new communication is possible, communication between a module which sends the communication request information and a module which is a partner of the communication specified in the communication request information is permitted. However, in the fifth embodiment currently described, if according to received communication request information, only a part of partners of communication specified in the communication request information is in an idle state in which new communication is possible, communication between a module which sends the communication request information and a module/modules in an idle state of the partners of communication specified in the communication request information is first permitted, and communication between the module which sends the communication request information and a module/modules in a busy state that new communication is impossible of the partners of communication specified in the communication request information cannot be permitted until the busy state of the module/modules is finished.

The difference between the fifth embodiment and the first embodiment will be described below.

Information showing whether a receiving destination to which information is unsent as shown in FIG. 25, that is, a module which cannot participate in communication though it should participate exists or not is added to a communication enabling signal 101 output from a channel allocation unit 16 shown in FIG. 24. In FIG. 25, all fields of an unsent receiving destination show a value 0, the value 0 shows that no unsent receiving destination exists and a value 1 shows that an unsent receiving destination exists.

The setting of values 1 and 0 may also be reverse.

As for an arbitration result signal shown in FIG. 26, the field of an unsent receiving flag is provided. When the unsent receiving flag shows a value 1, it shows that an unsent receiving destination exists and when the unsent receiving flag shows a value 0, it shows that no unsent receiving destination exists.

A register updating unit 11 turns a permission flag to 0 again and arbitrates again when the register updating unit detects the termination of communication the unsent receiving flag of which is '1'.

A communication destination contention determination unit 18 copies a communication destination module number 125 in an unsent receiving register 19 according to an instruction from a control unit 17 when a request for communication is newly made.

Requests for communication the permission flag of which is '0' though their request flag is '1' are selected based upon a signal 124 and the corresponding communication destinations are selected based upon the contents of the unsent receiving register 19. Next, each module number of each sending destination and response destination is collated with the contents of a signal 123, it is determined whether contention occurs or not and the result is output as a signal 126 as follows.

(1) The contention flag of a request for communication all the communication of which destinations are incommunicable is turned to a value '11'.

(2) The contention flag of a request for communication all the communication of which destinations are communicable is turned to a value '00'.

(3) The contention flag of a request for communication only a part of communication of which destinations are communicable and the other communication of which destinations are incommunicable is turned to a value '10'. As for a request for communication corresponding to a contention flag of the value '10', each module number of communicable modules and each module number of incommunicable modules are written to the unsent receiving register 19.

In the channel allocation unit 16, in the first embodiment shown in FIG. 10, a communication destination module number 125 is acquired, however, in the fifth embodiment, the information of communication destinations is acquired based upon a signal 141 from the unsent receiving register 19 in place of the above communication destination module number. If a request for communication the contention flag of which is '10' is selected, a communication enabling signal 101 including an unsent receiving flag of the value '1' is output as shown in FIG. 25. In this case, communication is performed for a part of all communication destinations. The value of an unsent receiving flag is sent to the register updating unit 11 in the form of a signal 129 and is further written to the field of an unsent receiving flag of the arbitration result register 13 in the form of a signal 122.

If plural modules are specified in the field of a receiving channel number shown in FIG. 25 and a part of them is in a busy state when communication is first requested, the communication of the modules is performed later, however, if a response module exists in the communication, the same response module is also specified again in the later communication of the residual modules which are formerly in a busy state and a response is sent to the residual modules (the residual response destinations) from the response module.

When the execution of a request for communication is shared into plural times, it is desirable that the following devices are adopted so that a long interval is not made between each communication of plural times. That is, if an unsent receiving flag of the value of '1' is stored in the arbitration result register, the communication destination contention determination unit 18 inhibits new communication with the corresponding communication destination (the destination which does not participate in the communication yet of the communication the unsent receiving flag of which is '1') and allows new communication to only communication of which none of the communication destinations contends with the communication the unsent receiving flag of which is '1' and of which none of the communication destinations is busy, and a priority request selection unit 15 selects a request for communication the unsent receiving flag of which is '1' prior to the selection of another request for communication. Hereby, the execution of a request for communication made only once can be continuously shared into plural times.

As described above, according to the present invention, the contention of a transmission channel and contention at a communication destination can be effectively solved and various communication between/among modules can be implemented, enhancing the availability factor of a transmission channel. The present invention can also be applied to access control by a signal having a directional propagation property.

What is claimed is:

1. A communication device, comprising:
   a multiple bus provided with plural channels over each of which a signal is transmitted;
   plural modules that send/receive a signal via the multiple bus; and
   an arbiter that arbitrates the right for the plural modules to use the multiple bus, wherein
   each of the plural modules makes a request for communication to the arbiter by sending communication request information in which one or more communication partners are specified to the arbiter when each communicates with another one or more modules; and
   the arbiter specifies an idle channel based upon received communication request information in case a communication partner specified based upon the communication request information is in an idle state in which new communication is possible and an idle channel over which new communication is possible exists in the multiple bus, and permits communication between a module which sends the communication request information and a module which is a communication partner specified in the communication request information using the specified idle channel.

2. The communication device according to claim 1, wherein the arbiter permits communication between a module which sends communication request information and a module which is a communication partner specified in the communication request information based upon received communication request information in case all communication partners specified in the communication request information are in an idle state in which new communication is possible.

3. The communication device according to claim 1, wherein the arbiter first permits communication between a module which sends communication request information and a module/modules in an idle state of modules which are communication partners specified in the communication request information based upon received communication request information in case only a part of communication partners specified in the communication request information is in an idle state in which new communication is possible, and does not permit communication between the module which sends the communication request information and a module/modules in a busy state in which new communication is impossible of modules which are communication partners specified in the communication request information until the busy state of the module/modules is finished.

4. The communication device according to claim 1, wherein each of the plural channels composing the multiple bus has directivity in a direction in which a signal is transmitted.

5. The communication device according to claim 1, wherein the multiple bus transmits an optical signal.

6. The communication device according to claim 1, wherein the multiple bus permits only communication between modules each of which belongs to a different group of modules when the plural modules are classified into two groups of modules.

7. The communication device according to claim 1, wherein
   the arbiter is provided with a storage for storing a corresponding table between the plural modules and one or more communication partner modules specified in a request for communication from each module; and
   the plural modules send communication request information in which one or more communication partner modules are indirectly specified by specifying the address of the table to the arbiter when the plural modules communicate with another one or more modules.

8. The communication device according to claim 1, wherein each of the plural modules sends communication request information including first information in which one or more communication partner modules are specified, second information in which a response module which receives a signal sent from the module and responds is specified and further, third information in which a module which receives the response from the response module specified in the second information is specified, to the arbiter when the module communicates with another one or more modules.

9. The communication device according to claim 1, wherein each of the plural modules sends communication request information including information showing the priority of communication to the arbiter.

10. The communication device according to claim 9, wherein
    the arbiter permits communication for a request for communication of which the priority is high of requests for communication which can be permitted in case plural requests for communication contend, and
    the arbiter enhances the priority of communication for a request for communication which is not permitted last time in the next arbitration and afterward, determines a request for communication to be permitted.

11. A multiple bus control device, comprising:
    a communication request receiving unit that receives a request for communication from each module by receiving communication request information in which one or more communication partner modules are specified from the respective plural modules that send/ receive a signal utilizing a multiple bus provided with plural channels over each of which a signal is transmitted; and an arbiter that outputs information for specifying an idle channel and information for specifying plural modules that are permitted to communicate using the specified idle channel based upon communication request information received by the communication request receiving unit in case a communication partner specified in the communication request information is in an idle state in which new communication is possible and an idle channel over which new communication is possible exists.

12. A LSI for controlling a multiple bus, comprising:

a storage that stores a correspondence table describing correspondence between each of plural modules that send/receive a signal using a multiple bus provided with plural channels over each of which a signal is transmitted and one or more communication partner modules specified in a request for communication from each module;

an input terminal that inputs a communication request signal showing information for specifying one correspondence in the correspondence table from each of the plural modules;

a register that stores information included in a communication request signal input from the input terminal;

an arbiter that generates information for specifying an idle channel and information for specifying plural modules that are permitted to communicate using the specified idle channel based upon correspondence in the correspondence table specified in the information stored in the register in case a communication partner specified based upon the correspondence is in an idle state in which new communication is possible and an idle channel over which new communication is possible exists; and an output terminal that outputs an arbitration signal showing information generated by the arbiter.

* * * * *